US009541309B2

(12) United States Patent
Colwell

(10) Patent No.: US 9,541,309 B2
(45) Date of Patent: Jan. 10, 2017

(54) GEOTHERMAL LOOP IN-GROUND HEAT EXCHANGER FOR ENERGY EXTRACTION

(71) Applicant: Controlled Thermal Technologies Pty Ltd, Brisbane, Queensland (AU)

(72) Inventor: Rodney Grahame Colwell, Brisbane (AU)

(73) Assignee: Controlled Thermal Technologies Pty Ltd., Brisbane, Queensland (AU)

( * ) Notice: Subject to any disclaimer, the term of this patent is extended or adjusted under 35 U.S.C. 154(b) by 0 days.

(21) Appl. No.: 14/535,203

(22) Filed: Nov. 6, 2014

(65) Prior Publication Data
US 2015/0122453 A1    May 7, 2015

(30) Foreign Application Priority Data

Nov. 6, 2013  (AU) .................................. 2013904291

(51) Int. Cl.
*F24J 3/08* (2006.01)
*F03G 7/04* (2006.01)

(52) U.S. Cl.
CPC ................. *F24J 3/084* (2013.01); *F24J 3/085* (2013.01); *F03G 7/04* (2013.01); *F24J 3/086* (2013.01); *Y02E 10/12* (2013.01)

(58) Field of Classification Search
CPC .............. F24F 3/08; F24F 3/081; F24F 3/082; F24F 3/083; F24F 3/084; F24F 3/085; F24F 3/086; F24J 3/08; F24J 3/081; F24J 3/082; F24J 3/083; F24J 3/084; F24J 3/085; F24J 3/086; F24J 2003/087

USPC ........................................... 165/45, 142, 178
See application file for complete search history.

(56) References Cited

U.S. PATENT DOCUMENTS

| 3,874,174 | A | * | 4/1975 | Greene | .......................... 60/641.2 |
| 3,951,204 | A | * | 4/1976 | Movick | ................ F28D 15/025 |
| | | | | | 165/104.19 |
| 4,043,129 | A | * | 8/1977 | McCabe | ................. E21B 43/40 |
| | | | | | 166/369 |
| 4,171,721 | A | * | 10/1979 | Movick | ........................... 165/45 |
| 4,220,202 | A | * | 9/1980 | Aladiev et al. | ................. 166/57 |
| 4,325,228 | A | * | 4/1982 | Wolf | ......................... F24J 3/086 |
| | | | | | 165/142 |
| 4,392,531 | A | * | 7/1983 | Ippolito | .................. E21B 43/04 |
| | | | | | 165/45 |
| 4,492,083 | A | * | 1/1985 | McCabe | ................... F03G 7/04 |
| | | | | | 165/45 |
| 4,566,532 | A | * | 1/1986 | Basmajian | ............... F24J 3/085 |
| | | | | | 165/108 |
| 7,059,131 | B2 | * | 6/2006 | Hildebrand | .............. F24J 3/084 |
| | | | | | 60/641.2 |
| 8,365,815 | B2 | * | 2/2013 | Viernickel | ............... F24J 3/085 |
| | | | | | 166/278 |

(Continued)

*Primary Examiner* — Devon Russell
(74) *Attorney, Agent, or Firm* — Chernoff, Vilhauer, McClung & Stenzel, LLP

(57) ABSTRACT

A geothermal loop in-ground heat exchanger for energy extraction including an outer tubular casing and an inner tubular portion spaced from the outer tubular casing to define an injection space wherein a working fluid is injected into the injection space at a first temperature, $T_1$ while the heat exchanger is located in a geothermal heat reservoir and the working fluid exits through the inner tubular portion at a second temperature, $T_2$ which is greater than $T_1$.

17 Claims, 20 Drawing Sheets

(56) References Cited

U.S. PATENT DOCUMENTS

2010/0270003 A1* 10/2010 Sarria ............................. 165/45
2010/0272515 A1* 10/2010 Curlett .................... E21B 43/17
                                                                                                 405/55

* cited by examiner

GEOTHERMAL LOOP IN-GROUND HEAT EXCHANGER FOR ENERGY EXTRACTION

TECHNICAL FIELD

The present invention relates to geothermal energy devices and systems that extract naturally occurring subterranean geothermal heat from a subsurface formation or reservoir and deliver the heat to the surface where mechanical and or electrical power can be produced through the use of working fluids such as an expanding gas or expanding vapor devices.

BACKGROUND ART

The concept and function of geothermal energy systems is known in the art. The basic operation of geothermal energy system requires a "Hot Sedimentary Aquifer" that can be accessed by a deep borehole and the hot fluid ("primary working fluid") extracted to the surface through cased production wells for heat extraction through an aboveground heat exchanger, the spent aquifer water is pumped back into the reservoir to recharge the reservoir through a separate injection well. The heat removed in the heat exchanger is then used in, e.g. a Rankin Cycle power plant or similar to produce electrical energy.

Another form of geothermal energy systems is the "Enhanced Geothermal System" where brine ("primary working fluid") is injected into several (2 to 4) injection wells that access hot dry rock in the targeted reservoirs (typically through a series of reservoir fracturing to increase contact area between the hot dry rock and the brine) well below the surface and heat is transferred into the brine where it is recovered through a production well which is the remotely located from the injection well, to the surface. The recovered hot brine (typically in 2 phase flow of steam and hot water) is passed through a heat exchanger to extract heat for use in, e.g. a Rankin Cycle power plant or similar.

In each of these systems a suitably porous and permeable reservoir must be found to facilitate the circulation of the primary working fluid. This substantially restricts the reservoir numbers unless reservoir fracturing is employed, which is time consuming and costly and largely unpredictable. In addition, the open well configuration of both systems suffer from significant well scaling and corrosion which severely limits performance and at times lead to catastrophic failures.

Accordingly, there is a need for a geothermal energy system that can mitigate the scaling and corrosion problems as well as overcoming reservoir porosity and permeability limitations.

It will be understood that, if a prior art publication is referred to herein, this reference does not constitute an admission that the publication forms part of the common general knowledge.

SUMMARY OF INVENTION

The present invention in one form, resides broadly in a geothermal loop, in-ground heat exchanger for energy extraction including an outer tubular casing and an inner tubular portion spaced from the outer tubular casing to define an injection space wherein a working fluid is injected into the injection space at a first temperature, $T_1$ while at least a part of the heat exchanger is located in a geothermal heat reservoir and the working fluid exits through the inner tubular portion at a second temperature, $T_2$ which is greater than $T_1$.

In an alternative embodiment, the present invention resides in a method of energy extraction from a geothermal heat reservoir including the steps of providing a geothermal loop in-ground heat exchanger having an outer tubular casing and an tubular portion spaced from the outer tubular casing to define an injection space, locating at least a lower portion of the heat exchanger in a geothermal heat reservoir, injecting a working temperature at a first temperature, $T_1$ into the injection space and drawing of the working fluid from the inner tubular portion at a second temperature, $T_2$ greater than $T_1$.

The method may include an additional step of using the heat of the working fluid at a second temperature, $T_2$ in an appropriate thermodynamic recovery cycle in order to capture energy in the working fluid and returning spent working fluid to the heat exchanger at a temperature lower than a second temperature, $T_2$. In practice, the heat recovered from the working fluid can be removed from the working fluid to extract useable work from the heated working fluid such as for example to heat water to make steam to drive a turbine to generate electricity.

The naturally occurring hot reservoir can comprise a geothermal water reservoir, which incorporates any subterranean formation containing at least 10 percent water by volume, which may be required to transmit the geothermal heat from the naturally occurring hot reservoir to the outer shell tube casing. If the naturally occurring hot reservoirs do not contain at least 10% water by volume, then a fluid, preferably water, may need to be injected into the reservoir to maintain adequate heat transfer from the reservoir to the outer shell tube casing. In this way, the fluid injected into the reservoir may act as a transportable heat transfer medium in order to more effectively transfer the heat from the reservoir to the outer shell tube casing.

The working fluid can be any fluid or combination of a number of fluids that is capable of being vaporised or partially vaporised in the coaxial heat exchanger to allow its use in any Rankin Cycle based power plant. The working fluid may also be a gas (at atmospheric temperature and pressure) and be capable of being liquefied at high pressure and or lower temperatures.

The method and apparatus of the present invention is based around extracting geothermal energy through a well bore that houses the coaxial close loop heat exchanger that has a working fluid injected from the ground surface through the annulus part of the heat exchanger to the naturally occurring heated reservoir where heat is laterally transferred from the reservoir across the outer wall of heat exchanger to the working fluid. The length of the heat exchanger is preferably such that it will provide sufficient contact area with the working fluid to partially or completely vaporise the working fluid. The vaporised working fluid flows to the bottom of the heat exchanger and up through the internal core of the heat exchanger to the surface where it is directed to a power cycle for electricity generation.

The contact area of the heat exchanger is basically the surface area of the outer tubular casing over the height of the tubular casing which is located in the heat reservoir. Due to the natural heat gradients present in the heat reservoir (typically, heat increases as the depth increases) the working fluid also undergoes a gradual heating as it travels to the bottom of the heat exchanger, and therefore problems related to sudden or rapid expansion of the working fluid when heated, can be mitigated.

The internal tubular portion of the heat exchanger may be partially insulated by air or any insulating material in the upper zone of the heat exchanger to mitigate heat loss to the preferred annular injection space.

The mechanical supports between the internal tubular portion and the outer shell of the coaxial heat exchanger preferably allows the internal core to expand and contract independently of the outer shell and provide an implosion prevention support to the outer shell.

In locating the heat exchanger within the bore hole, it is preferred that the outer tubular casing is not forced to the lower extreme of the borehole. Preferably, there is a space or volume between the lower wall of the outer tubular casing and the lower wall of the borehole. This relatively shorter length of the outer tubular casing to the borehole depth allows the outer shell to expand and contract longitudinally without buckling.

The outer tubular casing can have any cross-sectional shape. The outer tubular casing may have surface effects, coatings or modifications in order to enhance heat transfer, particularly in the area which is located in the heat reservoir. Preferably, the outer tubular casing is substantially circular in cross-section. The outer tubular casing will normally have a closed bottom, typically by the provision of a lower wall. In a particularly preferred embodiment, the outer tubular casing will therefore be configured as an open topped, closed bottomed cylindrical shape.

The outer tubular casing may have any length appropriate to position at least a portion of the heat exchanger within a heat reservoir located in the ground. One or more portions may be attachable together in order to set the length.

According to one preferred embodiment, the heat exchanger will be made up from a number of portions or lengths that have a similar configuration except for the bottom portion or length which will have a closed bottom wall. Where provided in a number of portions or lengths, each portion or length may be provided with at least a portion of an attachment assembly in order to attach adjacent portions or lengths relative to one another.

Typically, the outer tubular casing will be radially smaller in dimension than the borehole into which it is located. Longitudinally, the outer tubular casing will preferably be shorter than the borehole height in order to space the lower wall of the outer tubular casing from the bottom of the borehole. The relative dimensions of the outer tubular casing and the borehole will preferably allow for expansion.

One or more portions of the outer tubular casing may be insulated in order to prevent heat loss. Preferably, a portion of the outer tubular casing located above the heat reservoir may be insulated in order to prevent heat loss while the working fluid travels through this region.

The outer tubular casing may be secured to the borehole wall in one or more regions. Preferably, a thermally conductive bonding agent will be used to secure the outer tubular casing to the borehole wall. A preferred bonding agent will allow expansion and contraction of the outer tubular casing while maintaining the attachment. The bonding agent according to the present invention may comprise any cement type specified in *API Specifications for Material and Testing for Well Cements*, American Petroleum Institute Specifications 10, 5th edition, Jul. 1, 1990.

The outer tubular casing may be provided in different portions, preferably with thermally conductive portions in locations that are to be positioned within the heat reservoir, and nonconductive or insulated portions in other parts.

The heat exchanger of the present invention also includes an inner tubular portion spaced from the outer casing to define an injection space. Preferably, the cross sectional shape of the inner tubular portion corresponds to the shape of the outer casing. Preferably, the inner tubular portion is located concentrically within the outer tubular casing. In the particularly preferred embodiment where the cross-sectional shapes are circular, this will preferably define an annular injection space.

Preferably, the inner tubular portion and the outer tubular casing are concentric over the height of the heat exchanger apparatus. However, there may be portions of the inner tubular portion (or the outer tubular casing) that vary in shape and/or in dimension in order to optimise the shape and/or dimension of the injection space in particular region(s). For example, while an annular injection space is preferred, it may be preferable in some situations to increase the dimension of the inner tubular portion relative to the outer tubular casing, particularly in the heat reservoir zone of the heat exchanger in order to optimise heat load or transfer in the region. In a similar way, it may be preferred to have a larger injection space in an upper portion of the heat exchanger in order to allow injection of the working fluid to be made more efficient.

However, a consistent spacing between the inner tubular portion and the outer tubular casing is preferred for consistent flow and control over the flow of the working fluid. Providing consistent spacing between the two components also means that where the heat exchanger is provided in a number of portions or lengths, any portion or length can be used in any order of assembly except for the lowermost portion with the closed bottom wall and spacing between the lower end of the inner tubular portion and the lower wall.

Preferably, the inner tubular portion is attached or mounted to the outer casing in order to define the separation distance therebetween. Normally, one or more supports are used to attach or mount the inner tubular portion to the outer casing.

According to a particularly preferred embodiment, a number of support legs extend laterally between the inner tubular portion and the outer casing. Typically, the support legs are provided perpendicularly between the inner tubular portion and the outer casing. Preferably, the support legs are radially spaced from one another in order to maintain the injection space but allow flow of the working fluid longitudinally through the injection space.

The support legs may be shaped to reduce frictional losses.

Preferably, the support legs are arranged in groups or sets. Preferably, each set of support legs is provided at the same level with a preferred number of four support legs are spaced about the circumference of the inner tubular portion. A number of sets are spaced over the height of the heat exchanger. The support legs of each set may be aligned with the respective support legs of each other set, however this may be varied in order to optimise or adjust flow patterns of the working fluid through the injection space. For example, support legs may be located and/or shaped in a particular way so as to promote mixing of the working fluid in the injection space to allow for consistent heating of the working fluid.

The support legs may have any configuration and particularly, they may be of fixed length or they may be of expandable length. In their simplest form, the support legs will be a rigid member located between the inner tubular portion and outer casing and fixed to both using an appropriate mechanism dependent on properties of the inner tubular portion and outer casing. Preferably, the support legs may provide for a small degree of radial expansion may take place when the heat exchanger heats up.

Preferably, the lower end of the inner tubular portion will be open and normally, the lower end of the inner tubular portion will be spaced from the lower wall of the outer casing in order to provide an inversion space to allow the working fluid to enter the inner portion from the outer injection space.

One or more portions of the inner tubular portion may be insulated from the outer casing in order to maintain heat in the working fluid within the inner tubular portion, particularly toward an upper end of the heat exchanger as this is where the heat differential between the hot working fluid in the inner tubular portion and the cooler working fluid in the injection space will be largest. Therefore, the inner tubular portion may be insulated at an upper region from the injection space and the outer casing may also be insulated from the borehole. Insulation can be provided either within the inner tubular portion or outer casing or on an external side of the inner tubular portion or outer casing.

Any mechanism for injecting the working fluid into the injection space may be used.

Further, any working fluid could be used. The working fluid may be chosen to undergo a change in phase upon heating or not. In some instances, a phase change may be preferred in order to minimise the injection requirements as the vaporised fluid will typically exit the inner portion due to convective forces rather than requiring pumping force to drive the working fluid down through the injection space and as well as back up through the inner tubular portion.

The insulation used may take any form. For example, the inner tubular portion may be insulated from the outer casing or injection space using a material layer or alternatively, an air barrier may be provided, possibly between an outer surface of the inner tubular portion and a third wall located between the inner tubular portion and the outer casing to define an insulating air barrier therebetween.

The heat exchanger may be inserted into the borehole in a tubular insertion sleeve and once properly located, the insertion sleeve can then be removed. In this configuration, the thermally conductive bonding agent which is preferably used to attach the outer casing to the borehole walls, may be injected between the outer casing and the tubular insertion sleeve prior to removal of the insertion sleeve. This will typically protect the heat exchanger outer casing during insertion into the borehole. Normally, the tubular insertion sleeve will be concentric with the outer casing but can be of any shape.

The in-ground heat exchanger of the present invention is normally inserted into a heat reservoir containing at least 10% water by volume. If sufficient water is not present, additional water may be injected into the heat reservoir in order to optimise the heat transfer between the reservoir and the outer casing of the heat exchanger. Normally, the amount of water that is present will be sufficient to act as a heat transfer bridge between the heat reservoir and the heat exchanger of the present invention by increasing the surface area in contact with the heat exchanger. It has been found that 10% is a preferred minimum level of water but smaller amounts may accomplish the required heat transfer bridge.

Where a tubular insertion sleeve is used to locate the heat exchanger, any additional water may be injected into the heat reservoir using the insertion sleeve prior to injection of the thermally conductive bonding agent and prior to removal of the insertion sleeve. Therefore, openings may be provided in the insertion sleeve in order to allow the injected water out into the heat reservoir.

According to the aspect discussed immediately above, water is used as a heat carrier to transport heat to the in-round heat exchanger. According to an alternative aspect, a counter current heat shell may be used.

In particular, a counter current heat shell may be used for an in ground heat exchanger in a production capacity to enhance heat transfer to the "cold" fluid. In a particularly preferred embodiment, the counter current heat shell is preferably external to the outer shell casing. Normally, the in ground heat exchanger of the present invention has the "cold" fluid flowing downwardly through an annular volume defined between the inner core tube and the outer shell casing and the "hot" fluid exiting upwardly through the inner core tube.

According to a preferred embodiment, the counter current heat shell is preferably provided about the outside of the outer shell casing. Preferably, the counter current heat shell is substantially annular. Typically, the counter current heat shell will be provided outside the outer shell casing in at least a part of a heat transfer zone underground.

Preferably, the counter current heat shell is provided about the outer shell casing from the bottom of the heat exchanger of the present invention to an upper position which is spaced from the top of the heat exchanger. Preferably, the upper terminus of the counter current heat shell will still be below the ground surface.

The counter current heat shell of the present invention is preferably a closed, annular shell except for entry openings along the length of the shell allowing an appropriate heat carrier to enter the shell, and at least one reinjection port allowing the heat carrier to exit the shell. In the most preferred embodiment, the heat shell will be a closed topped, closed bottomed cylindrical shape with one or more entry openings.

Preferably, one or more entry openings are provided in an outer wall of the counter current heat shell in order to allow the heat carrier to access the shell. The openings can be provided in both the sidewall and the base wall of the counter current heat shell. The upper end of the shell will preferably be substantially sealed except for the at least one reinjection port.

At least one reinjection port is typically provided towards or at an upper end of the substantially closed shell. The provision of one or more entry openings in an outer wall of the counter current heat shell and the provision of at least one reinjection port towards or at an upper end of the substantially closed shell will allow the heat exchanger of the present invention to take advantage of the pressure differential that is created as a result of the heat loss by the heat carrier in the heat shell to the working fluid in the annular volume between the inner core tube and the outer shell casing to drive the release of the heat carrier from the upper portion of the heat shell which will preferably encourage the counter current flow of the heat carrier upwardly.

The at least one reinjection port of the counter current heat shell is preferably coupled to an elongate conduit or the like in order to return spent or depleted heat carrier to the geothermal heat reservoir. Typically, the elongate conduit will extend laterally, preferably some distance from the heat exchanger of the present invention. The elongate conduit may be provided with a downcomer or similar portion in order to reinject the spent fluid into an appropriate portion of the geothermal heat reservoir. Preferably, the lower terminus of the conduit or any downcomer or similar portion provided is higher than the bottom of the heat exchanger as this may assist with production of a convective flow pattern for the heat carrier. The particular flow pattern of the heat carrier is typically such that the flow pattern is counter current in the region adjacent the outer shell casing of the heat exchanger of the present invention.

Portions of the counter current heat shell or reinjection conduit may be provided with a coating of material with a low coefficient of friction or be manufactured of such material. This may reduce the effect that the adverse conditions may otherwise have on the materials used to create the counter current heat shell or reinjection conduit.

The geothermal heat reservoir into which the heat exchanger of the present invention is placed may be stimulated in order to encourage heat flow about the heat exchanger. Stimulation of such a reservoir is a relatively well-known practice in relation to oil wells, particularly those which are stagnating or nearing the end of their life.

Any stimulation technique may be used. For example, hydraulic or micro-seismic fracturing of the rock strata in the geothermal heat reservoir may be used. Sequenced stimulation of particular heat zones may be used in order to provide a systematic and more sustainable heat gradient.

The geothermal heat reservoir into which the heat exchanger of the present invention is placed will typically be monitored in order to plan use of the heat reservoir. According to a particularly preferred embodiment, a single heat exchanger of the present invention may be provided with more than one reinjection arrangement in order to allow an operator to shift the reinjection location and/or depth in order to maintain the heat gradient in the reservoir and to use the heat in the reservoir as sustainable as possible.

The closed loop coaxial heat exchanger assembly with counter current heat shell may include an expanded lower heat shell portion in addition to the counter current heat shell. Preferably, the expanded lower heat shell portion extends, generally downwardly from the counter current heat shell at the bottom of the heat exchanger of the present invention.

The lower heat shell portion of the present invention is preferably a closed shell in communication with the counter current heat shell except for entry openings over the length/height of the lower heat shell portion allowing an appropriate heat carrier to enter the lower heat shell portion. This configuration will preferably allow a heat carrier to move into and through the lower heat shell portion and then into the counter current heat shell.

The lower heat shell portion may have any shape or dimension. The lower heat shell portion of a particularly preferred embodiment is preferably slightly smaller in outer dimension than the outer shell casing of the in ground heat exchanger. In this configuration and therefore, the lower heat shell portion is smaller in outer dimension than the counter current heat shell.

An upper end of the lower heat shell portion will typically extend from a lower end of the counter current heat shell. Preferably, the difference in external dimension will result in a stepped appearance with the counter current heat shell being larger than the lower heat shell portion and a step or shoulder wall extending between the two portions, typically laterally and inwardly.

The lower heat shell portion may have any shape. The lower heat shell portion is preferably substantially circular in cross-sectional shape and is hollow. One or more internal structures may be provided in order to promote or and hence the flow characteristics of the heat carrier within the lower heat shell portion. The lower heat shell portion may extend laterally beyond the dimension of the counter current heat shell portion but this will typically create difficulties in positioning the lower heat shell portion in the ground substrate.

Preferably, one or more entry openings are provided in an outer wall of the lower heat shell portion in order to allow the heat carrier to access the lower heat shell portion. The openings can be provided in both the sidewall and the base wall of the lower heat shell portion. In the most preferred embodiment, the heat shell will be a closed bottom, open topped cylindrical shape with one or more entry openings in at least one sidewall and at least one base wall.

The benefits of large diameter drilling will mostly be on the ability to accommodate a larger diameter in-ground heat exchanger and increase the working fluid flow rate. At the expected permeability and enthalpy, the reservoir fluid is not wellbore-limited, and an increase in flow area will not typically increase the reservoir fluid production rate. Although it is possible to drill large diameter wells, it is not common practice, and cost would be significantly higher. When drilling such large wellbores there are multiple aspects to consider, such as: increased daily cost of a rig capable of such diameters and depths, as well as availability; increased pump capacity and mud storage for hole cleaning; additional cost for downhole and surface equipment, as well as availability concerns; likelihood of slow drilling.

Detailed pipeline design will also likely account for available materials (insulation, Teflon coating, alloy options) in the market and their applicability and limitations.

It may be possible to design a wellbore that houses a submersible pump and an in-ground heat exchanger. Artificial Lift through employing a submersible pump to keep the reservoir fluid pressurized (and keep the solids in solution), however, may assist with elimination of some of the issue that the in-ground heat exchanger of the present invention addresses.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a preferred embodiment of the present invention, a closed loop coaxial heat exchanger assembly is provided.

Figure 1:
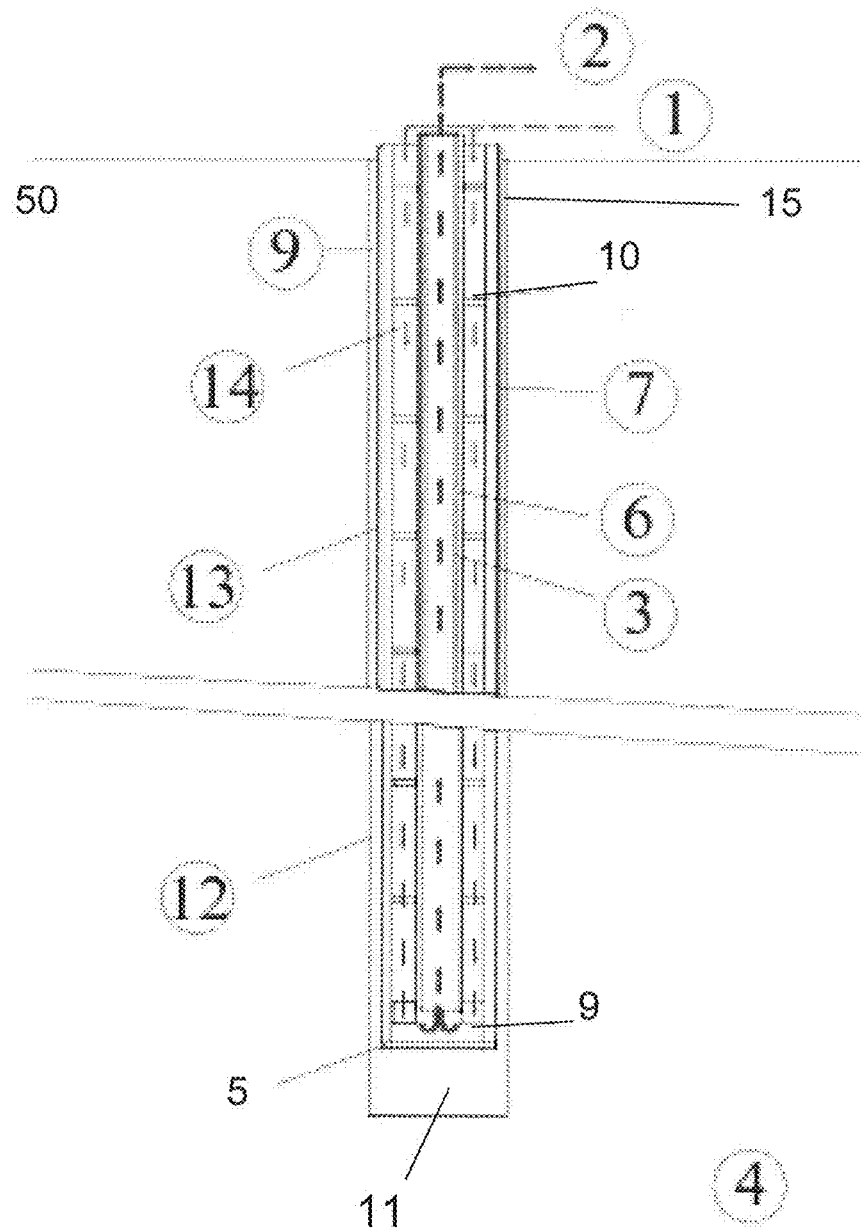
FIG. 1 is a sectional side elevation view of a preferred embodiment of the present invention.

FIG. 1 is a sectional side elevation view of the present invention where a wellbore is extending from the surface through to the naturally heated subterranean reservoir, housing the coaxial heat exchanger which is in conductive and convective communication with the reservoir.

The arrows in FIG. 1 illustrate the working fluid directional flow through the annulus from the injection point above ground level through the hot reservoir where heat is transferred laterally from the reservoir through the casing grout and outer shell of the coaxial heat exchanger to the working fluid. The working fluid continues to the bottom of the heat exchanger and back up through the core of the coaxial heat exchanger to the ground surface where it can be used for power production or heating or cooling and hence closing the loop.

Figure 2A:
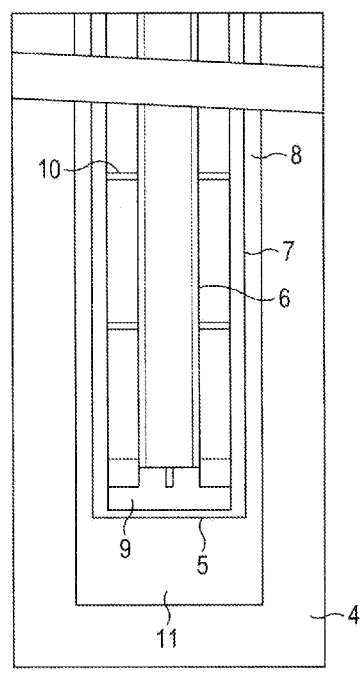
FIG. 2a is a sectional side elevation view of the bottom of the borehole with the bottom of the coaxial heat exchanger of the configuration illustrated in FIG. 1.
Figure 2B:
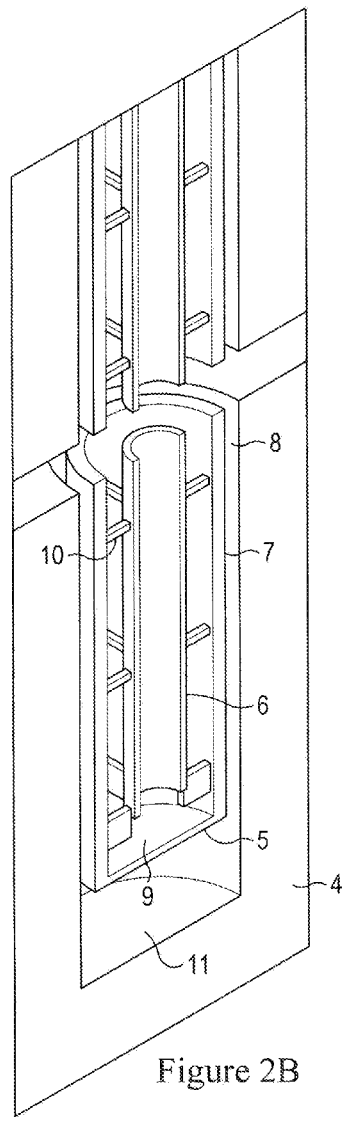
FIG. 2b is a sectional isometric view of the bottom of the borehole with the bottom of the coaxial heat exchanger of the configuration illustrated in FIG. 1.

FIG. 2a is a sectional side elevation view of the bottom of the borehole with the bottom of the coaxial heat exchanger and FIG. 2b is a sectional isometric view of the bottom of the borehole with the bottom of the coaxial heat exchanger.

One preferred embodiment of a closed loop, coaxial, in ground heat exchanger is illustrated in FIG. 1. The coaxial heat exchanger extends through any type of borehole known in the art from ground level (50) through to the naturally occurring hot reservoir (4). The coaxial heat exchanger includes two metal tubes (6 & 7) that are separated by metal supports (10) which are welded to the inner core tube (6). The inner core tube (6) with the metal supports (10) attached, is pressed into the outer shell tube casing (7) to prevent it from collapsing during the installation.

The wellbore (12) can comprise an upright section or an angled section that extend down from the ground level (50) to the naturally occurring hot reservoir (4).

The outer shell tube casing (7) can be secured to the wellbore wall (12) by a thermally conductive bonding agent (15) known in the industry of securing casing to an in-ground wellbore wall. Alternatively, the outer shell tube casing may be separated from the wellbore wall 12 to create a surround volume 8.

The outer shell tube casing (7) will extend in one or more sections of tubing strings to a maximum of ninety eight percent of the borehole length to allow for expansion. The outer shell tube casing (7) can be formed of any material known in the art for use in a tubing string. In one embodiment;

the lower section of the outer shell tube casing (7) that is in contact with the naturally occurring hot reservoir (4) can be made from materials that are thermally conductive to allow heat to be absorbed through to the working fluid (1); and the upper section of the outer shell tube casing (7) that is in contact with the upper ground level (10) can be made from materials that are thermally non-conductive or insulated by a thermally non-conductive outer casing (13) to prevent heat from dissipating from the injected working fluid (1).

The upper section of the inner core tube (6) is insulated (3) from the annulus section to mitigate heat losses from the heated working fluid (2) to the relatively cooler working fluid (1).

The preferred initial working fluid (1) is injected in its liquid phase and transported through the annular section (14) to the hot reservoir (4). Heat is then transferred from the hot reservoir (4) across the outer shell tube to the working fluid (1) causing the working fluid (1) to change phases from a liquid to a vapour either in total or in part. The resulting vaporised working fluid (2) can then flow through the bottom opening (5) of the inner core tube (6) to the surface (50) where it can be utilised to extract useful work or heat.

The predominantly vaporised working fluid (2) travelling up the inner core tube (6) is flowing counter-current to the relatively cool injected working fluid (1) flowing through the annulus (14) of the coaxial heat exchanger, causing heat losses in the heated fluid (2). In one embodiment, the inner core tube is insulated (3) from the annulus to prevent heat loses. The insulating mechanism (3) can be an air barrier or any insulating material known in the art.

Figure 3:
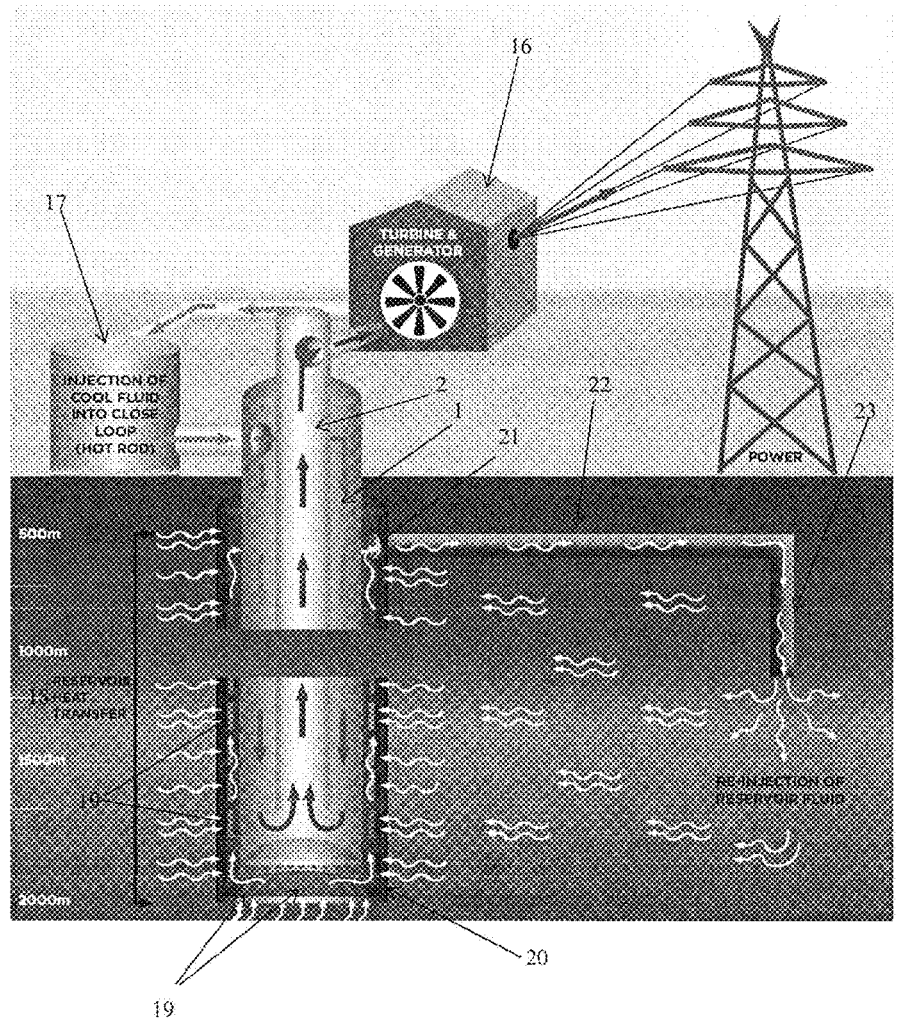
FIG. 3 is a schematic view from the side of a production in-ground heat exchanger and system according to a second preferred embodiment of the present invention.

According to an alternative aspect, a counter current heat shell as illustrated in FIG. 3 may be used.

In the preferred embodiment illustrated in FIG. 3, the counter current heat shell is external to the outer shell casing 7. As illustrated, the in-ground heat exchanger of the embodiment has the "cold" fluid 1 flowing downwardly through the annular volume 14 defined between the inner core tube 6 and the outer shell casing 7 and the "hot" fluid 2 exiting upwardly through the inner core tube 6. The hot fluid is then sent to a turbine and power generation set 16 before being returned to the balancing tank According to an embodiment illustrated in FIG. 3, the counter current heat shell 20 is provided about the outside of the outer shell casing 7. The counter current heat shell 20 is substantially annular and is provided outside the outer shell casing 7 in at least a part of the geothermal heat reservoir 18 underground.

The counter current heat shell 20 is provided about the outer shell casing 7 from the bottom of the heat exchanger of the present invention to an upper position which is spaced from the top of the heat exchanger. Preferably, the upper terminus of the counter current heat shell will still be below the ground surface as illustrated in FIG. 3.

The counter current heat shell 20 of the present invention is preferably a closed, annular shell except for a number of entry openings 19 along the length of the shell 20 allowing an appropriate heat carrier to enter the shell 20. There is also a reinjection port 21 allowing the heat carrier to exit the shell 20. In the most preferred embodiment, the heat shell will be a closed topped, closed bottomed cylindrical shape with a number of entry openings 21.

Preferably, entry openings 21 are provided in an outer wall of the counter current heat shell 20 in order to allow the heat carrier to access the shell 20 and the base wall of the counter current heat shell 20 as illustrated in FIG. 3. The upper end of the shell will preferably be substantially sealed except for the reinjection port which is spaced from the upper end of the shell 20 in FIG. 3.

The provision of the entry openings 19 in an outer wall of the counter current heat shell 20 and the provision of reinjection port 21 towards or at an upper end of the substantially closed shell will allow the heat exchanger to take advantage of pressure differentials created as a result of the heat loss by the heat carrier in the heat shell 20 to the "cold" working fluid 1 in the annular volume 14 between the inner core tube 6 and the outer shell casing 7, to drive the release of the heat carrier from the upper portion of the heat shell 20 which will preferably encourage the counter current flow of the heat carrier upwardly.

The reinjection port 21 is coupled to an elongate conduit 22 in order to return spent or depleted heat carrier to the geothermal heat reservoir 18. Typically, the elongate conduit 22 extends laterally, preferably some distance from the heat exchanger. The elongate conduit is provided with a downcomer 23 in order to reinject the spent fluid into an appropriate portion of the geothermal heat reservoir 18. Preferably, the lower terminus of the downcomer 23 provided is higher than the bottom of the heat exchanger as this may assist with production of a convective flow pattern for the heat carrier. The particular flow pattern of the heat carrier is typically such that the flow pattern is counter current in the region adjacent the outer shell casing of the heat exchanger as illustrated schematically in FIG. 3. In the present specification and claims (if any), the word 'comprising' and its derivatives including 'comprises' and 'comprise' include each of the stated integers but does not exclude the inclusion of one or more further integers.

Figure 4:
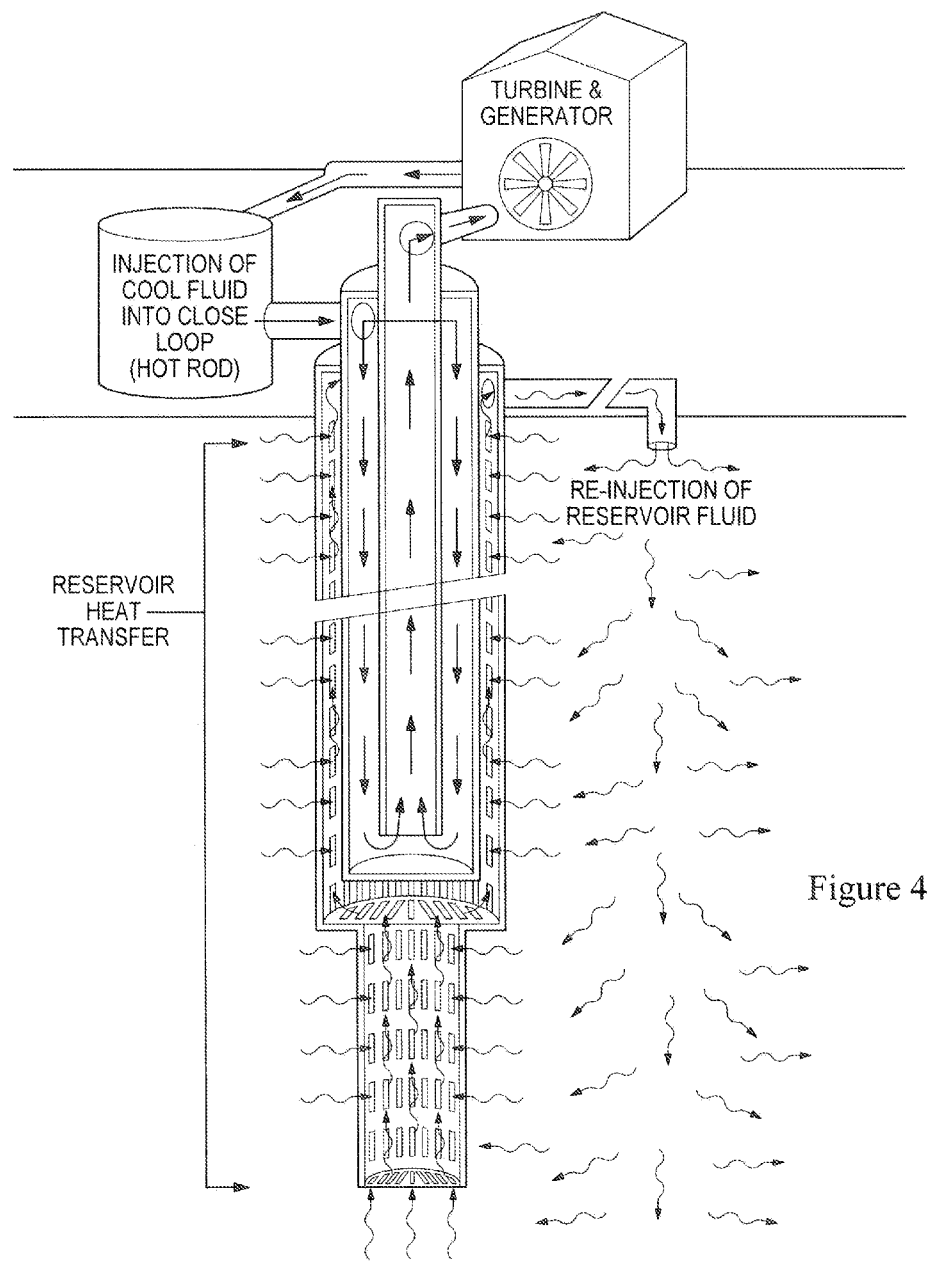
FIG. 4 is a schematic view from the side of a production in-ground heat exchanger and system according to a third preferred embodiment of the present invention.

An alternative embodiment of the closed loop coaxial heat exchanger assembly with a counter current heat shell is illustrated in FIG. 4. This configuration is similar to the configuration illustrated in FIG. 3 but further includes an expanded lower heat shell portion in addition to the counter current heat shell. As illustrated, the expanded lower heat shell portion extends, generally downwardly from the counter current heat shell at the bottom of the heat exchanger of the present invention.

The lower heat shell portion of the present invention is preferably a closed shell in communication with the counter current heat shell except for entry openings over the length/ height of the lower heat shell portion allowing an appropriate heat carrier to enter the lower heat shell portion. This configuration will preferably allow a heat carrier to move into and through the lower heat shell portion and then into the counter current heat shell.

The lower heat shell portion may have any shape or dimension. The lower heat shell portion of a particularly preferred embodiment is preferably slightly smaller in outer dimension than the outer shell casing of the in ground heat exchanger. In this configuration and therefore, the lower heat shell portion is smaller in outer dimension than the counter current heat shell.

An upper end of the lower heat shell portion will typically extend from a lower end of the counter current heat shell. Preferably, the difference in external dimension will result in a stepped appearance with the counter current heat shell being larger than the lower heat shell portion and a step or shoulder wall extending between the two portions, typically laterally and inwardly.

The lower heat shell portion may have any shape. The lower heat shell portion is preferably substantially circular in cross-sectional shape and is hollow. One or more internal structures may be provided in order to promote or and hence the flow characteristics of the heat carrier within the lower heat shell portion. The lower heat shell portion may extend laterally beyond the dimension of the counter current heat shell portion but this will typically create difficulties in positioning the lower heat shell portion in the ground substrate.

Preferably, one or more entry openings are provided in an outer wall of the lower heat shell portion in order to allow the heat carrier to access the lower heat shell portion. The openings can be provided in both the sidewall and the base wall of the lower heat shell portion. In the most preferred embodiment, the heat shell will be a closed bottom, open topped cylindrical shape with one or more entry openings in at least one sidewall and at least one base wall.

The geothermal loop in-ground heat exchanger of FIG. 3 was represented by a numerical heat transfer model within an area south of the operating geothermal projects in the Salton Sea geothermal field in Southern California, so as to estimate the level of energy extraction available from the resource conditions present, and by using the fluid transient simulation software OLGA. The resource conditions used in the model were based on flow test data from nearby deep production wells. Other modelling parameters were based on conventional engineering practices.

The numerical model of the geothermal loop in-ground heat exchanger system was used to forecast the heat transfer potential from the reservoir fluid to the working fluid under different conditions. The salient results of the model simulations are as follows:

At the flow rates used in the base case, the working fluid heats up to within two degrees Celsius of the reservoir fluid temperature after just 560 m length of the geothermal loop in-ground heat exchanger. This suggests that the geothermal loop in-ground heat exchanger does not need to extend to the bottom of the well to heat the working fluid to near-reservoir temperatures.

Heat transfer between the cool working fluid in the annulus of the geothermal loop in-ground heat exchanger and the heated working fluid returning through the center tube is significant. The working fluid that has been heated to reservoir fluid temperatures downhole loses most of this heat as it exchanges heat with the incoming cool working fluid at the upper portion of the well. This suggests that the center pipe for returning the heated working fluid to the surface should be insulated to prevent losing heat to the cooler fluid in the annulus of the geothermal loop in-ground heat exchanger.

The reservoir fluid drops temperature as it flashes going up the wellbore (flashing starts at 240 m depth in the base case). With the expected reservoir pressure in the target location, the potential wells will not be able to flow to surface unless part of the reservoir fluid vaporizes to reduce the hydraulic gradient, or some form of artificial lift is employed. The potential for scaling inside the wellbore casing and outside the geothermal loop in-ground heat exchanger shell is a possibility, and clean-out of this scale should be considered in the design of the Geothermal loop in-ground heat exchanger.

The circulation rate of the working fluid appears to be a limiting factor in the heat transfer between the reservoir and the working fluids. The circulation rate of the working fluid was limited by the capacity of the center return pipe in the model.

Working fluid with a lower inlet temperature going to the geothermal loop in-ground heat exchanger will maximize the amount of heat extracted from the wellbore fluid.

At higher reservoir temperatures, the heat lost by the working fluid flowing up through the center pipe to the downward-flowing cool working fluid in the geothermal loop in-ground heat exchanger annulus is more significant. The working fluid temperature was simulated to drop from 240° C. to 200° C. as the fluid travels to the surface. Lower conductivity material on the center tube would have even more benefits at higher reservoir temperatures.

Higher well production rates will not improve heat transfer as long as the working fluid circulation rate is limited by the design and pipe diameters used in the model.

Disclosed is a downhole closed-loop heat extraction system. This tubular system is designed to be deployed within a large-diameter geothermal well that is open to thermal aquifers at depth and closed (cased) further up the wellbore. The concept is that hot reservoir fluids will enter the annular space around the geothermal loop in-ground heat exchanger at depth, and flow upward in the annulus to enable a more complete transfer of heat to the geothermal loop in-ground heat exchanger further up the well. The reservoir fluid would be produced at the surface and then injected at a nearby injection well.

Figure 5:
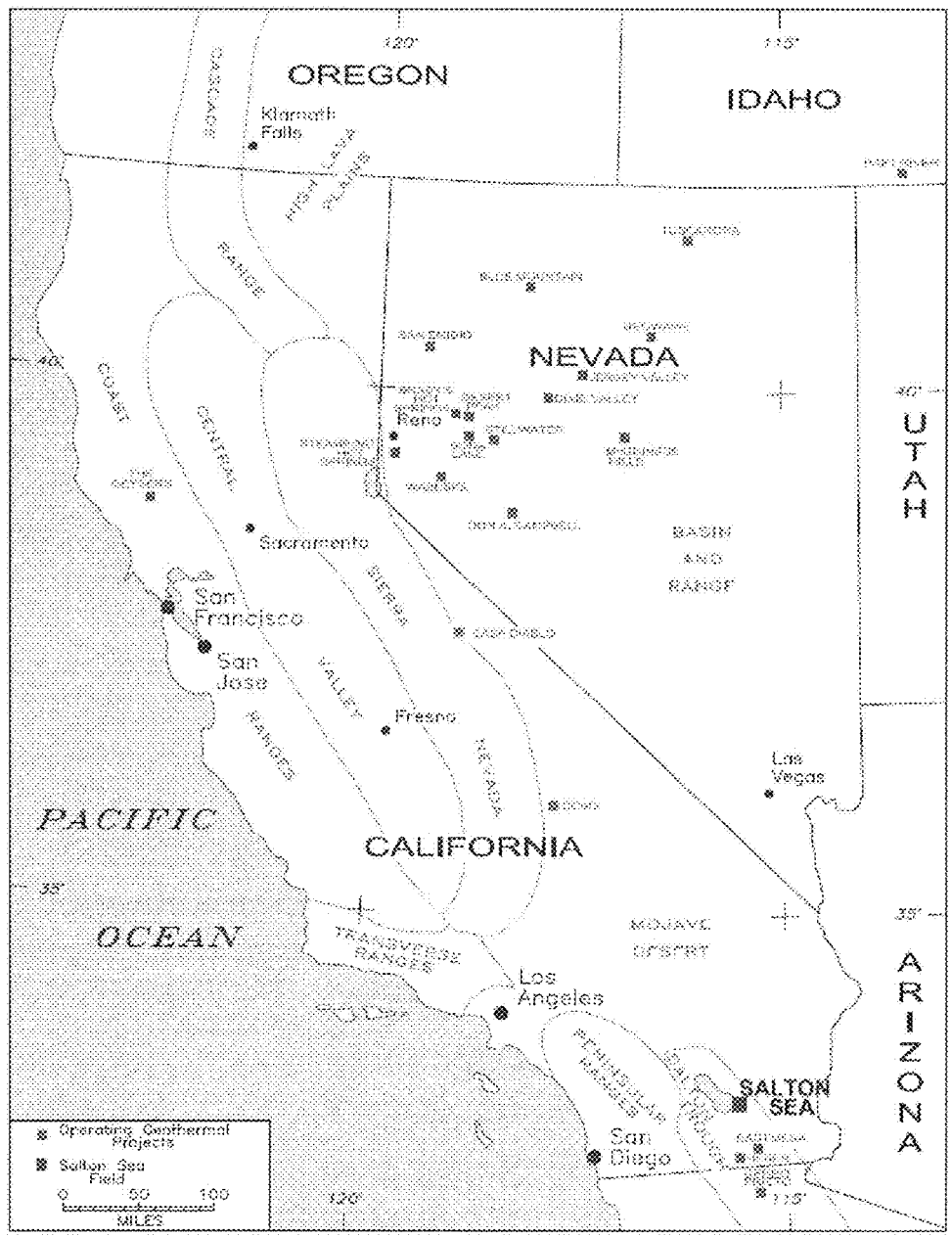
FIG. 5 is a schematic illustration of the location of the Salton Sea Field used in the heat transfer model of a preferred embodiment of the present invention.
Figure 6:
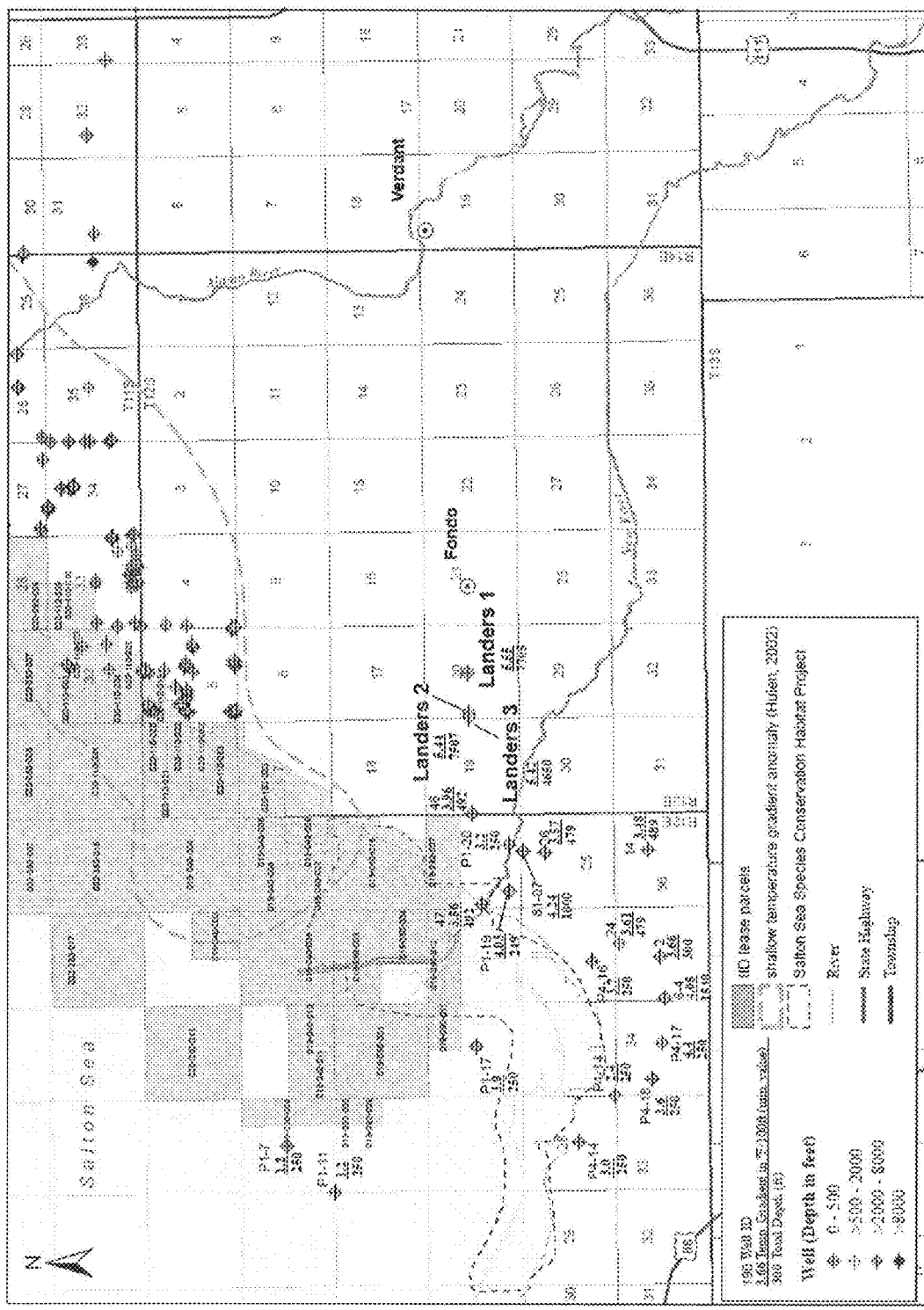
FIG. 6 is a project map of the South East Salton Sea area showing the location of the number of wells used in the heat transfer model of a preferred embodiment.

The geothermal loop in-ground heat exchanger was tested in southwest California, at the Salton Sea KGRA, within IID acreage that lies along the southeast end of the Sea, near the delta of the New River (FIGS. 5 and 6). The model previously discussed provided a heat transfer model of the geothermal loop in-ground heat exchanger using reservoir parameters obtained through the evaluation of the geothermal resource beneath IID acreage.

The Salton Sea geothermal field is located in southwest California, along the southeast shore of the Salton Sea, where IID has multiple land leases (FIG. 5), and one particular area of interest is located along the SE end of the Sea, near the delta (sand banks) of the New River (FIG. 6), where the geothermal loop in-ground heat exchanger was installed for test purposes. It was therefore necessary to research and evaluate the geology and geothermal resource within and adjacent to the area; this was completed through the review of offset wells previously drilled The resource parameters used for the heat transfer model were gathered from wells located near the SE end of the Sea.

The IID leases of interest are situated above either agricultural land, wetland area from the New River, or the Sea itself, and are located just to the south of the developed and highly productive Salton Sea Geothermal Field. Because of their proximity, some discussion of what is known about the developed field is warranted.

The Salton Sea Geothermal Field (SSGF), which borders the south eastern edge of the Salton Sea, lies above a liquid dominated reservoir with measured temperatures as high as 630° F. (332° C.). Exploration of the SSGF area to evaluate its electrical generation capacity began in 1927, with estimates of the electric-energy potential given at 80 to 800 MW. In the 1960s, geophysical surveys confirmed the existence of these and other geothermal areas (Rex et al., 1971; Fonseca et al., 1981). Early drilling efforts in the SSGF were delayed after encountering problems such as severe corrosion from the high salinity and dissolved gases in the geothermal fluids. Even though a small power plant operated at SSGF for a few months in 1959 (Palmer et al., 1975), it was not until 1982 that the first commercial plant of 10 MW (Salton Sea Unit 1) began generating.

Salton Sea Unit 3 was brought online in 1989, adding 50 MW to the system. In 1985, Vulcan Geothermal Power Company opened a 34 MW plant, and in 1988 the Del Ranch plant added an additional 38 MW. The 38 MW Leathers plant was installed in 1989, bringing the total operating field capacity to 170 MW. Salton Sea Unit 2 is an integrated facility with Unit 1 that commenced operation under Unocal in 1990, and increased the output of Unit 1 from 10 to 30 MW or more. In the same year, the J.J. Elmore Power Plant added 38 MW to the total field production. Unocal's Salton Sea assets were sold to Magma Power Company in 1993. Unit 4 was brought online in 1997, adding another 40 MW to the system, bringing the total to 268 MW. Unit 5 was started operation in 2000, adding 49 MW to the system, as well as CE Turbo, with an additional 10 MW, bringing the total to 327 MW (net). Salton Sea Unit 6 was proposed in 2002 to add another 185 MW to the system, but this project has not yet been developed. The overall Salton Sea has an estimated energy capacity of more than 1,750 MW.

The California Division of Oil, Gas and Geothermal Resources (CDOGGR) has an extensive geothermal well database. All publicly available data concerning the wells within and adjacent to the IID leases of interest were used to help evaluate the geothermal resource conditions expected to be encountered for testing; these conditions were used in the heat transfer modeling of the geothermal loop in-ground heat exchanger. FIG. 6 shows the IID lease positions and geothermal wells that have been drilled in the vicinity. There are several shallow temperature gradient wells in the region, as well as a few deeper wells that range in depth from less than 500 feet (152 m) to about 8,000 feet (2,438 m).

Where possible, the shallow temperature gradient was calculated for each well. In the fairly homogeneous geologic environment of the Imperial Valley, the shallow temperature gradient is a reasonably good indicator of heat flow, provided that the gradient is conductive, which it is at most places in the valley. The conductive gradient normally decreases with depth, due to increasing rock thermal conductivity, and, where convective reservoir conditions are present, it may diminish to a small value or zero. Complete temperature profiles are generally not available for the wells in the CDOGGR database, so gradients have been estimated from the reported bottom-hole temperature and well depth; these are the values shown in FIG. 6.

Temperature gradient data are extremely useful in estimating heat flow anomalies, but they do not provide information regarding specific reservoir conditions (e.g., absolute reservoir temperatures, subsurface permeability, etc.), which are helpful to provide a more accurate heat transfer model for the geothermal loop in-ground heat exchanger in IID leases.

Figure 7:
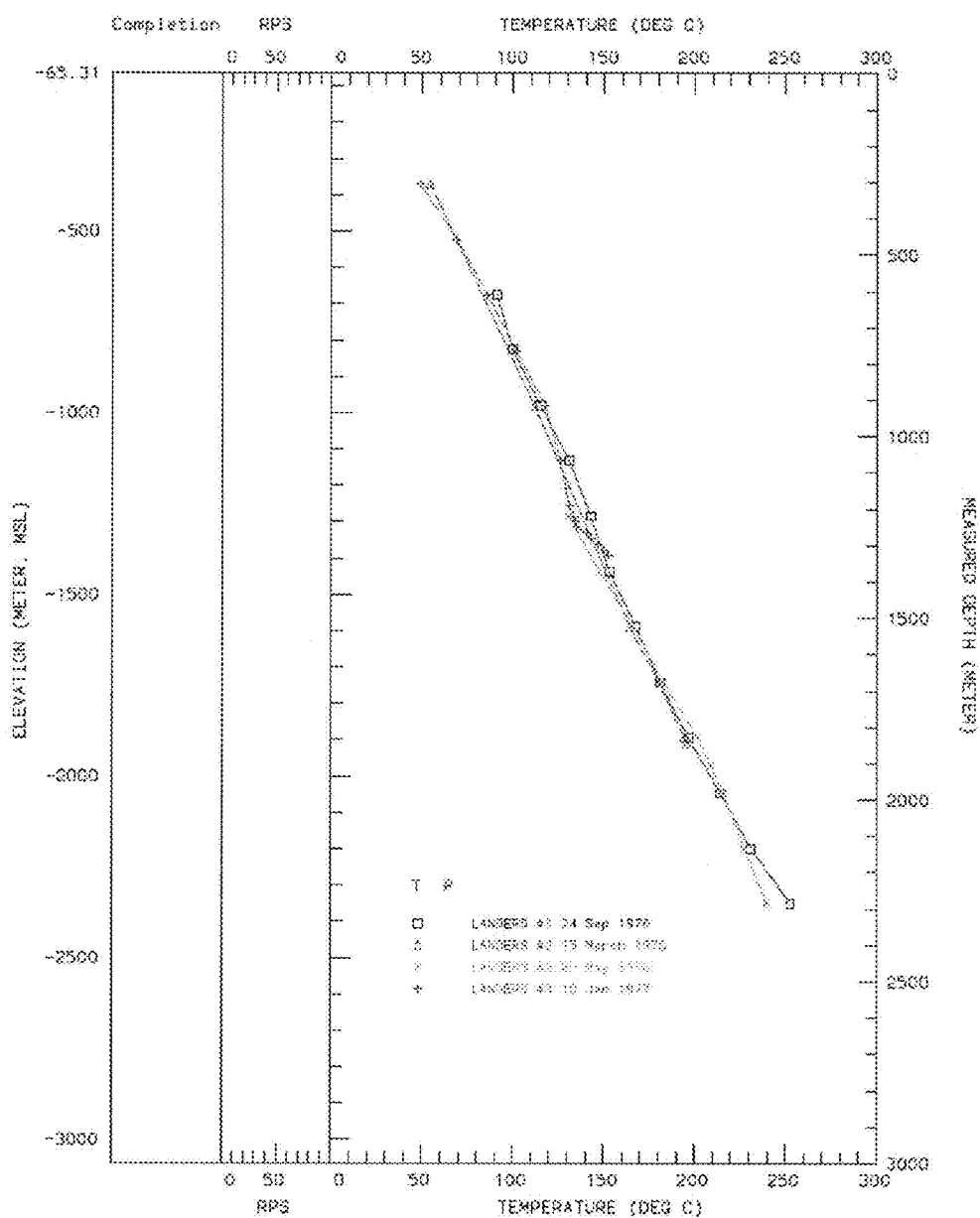
FIG. 7 is a downhole summary plot of the Salton Sea Landers Wells used in the heat transfer model of a preferred embodiment.

To best estimate actual reservoir conditions for the Geothermal loop in-ground heat exchanger heat flow model, deep offset wells located near the area of interest were evaluated. These deeper wells are associated with hydrothermal convection and provide data of anticipated reservoir conditions for the heat transfer model. The most relevant wells (i.e., wells drilled nearest to the area of interest, sufficiently deep and previously tested for permeability) are the Landers wells: Landers 1, 2 and 3. Drilled more than 30 years ago, these wells reached depths below 4,000 feet (1,219 m), and as deep as 7,705 feet (2,348 m). Temperature measurements were conducted on all wells, and flow and/or injection tests were performed shortly after they were drilled. FIG. 7 shows down-hole temperature surveys of Landers 1, 2 and 3. Key points from each well are highlighted below.

Figure 8:
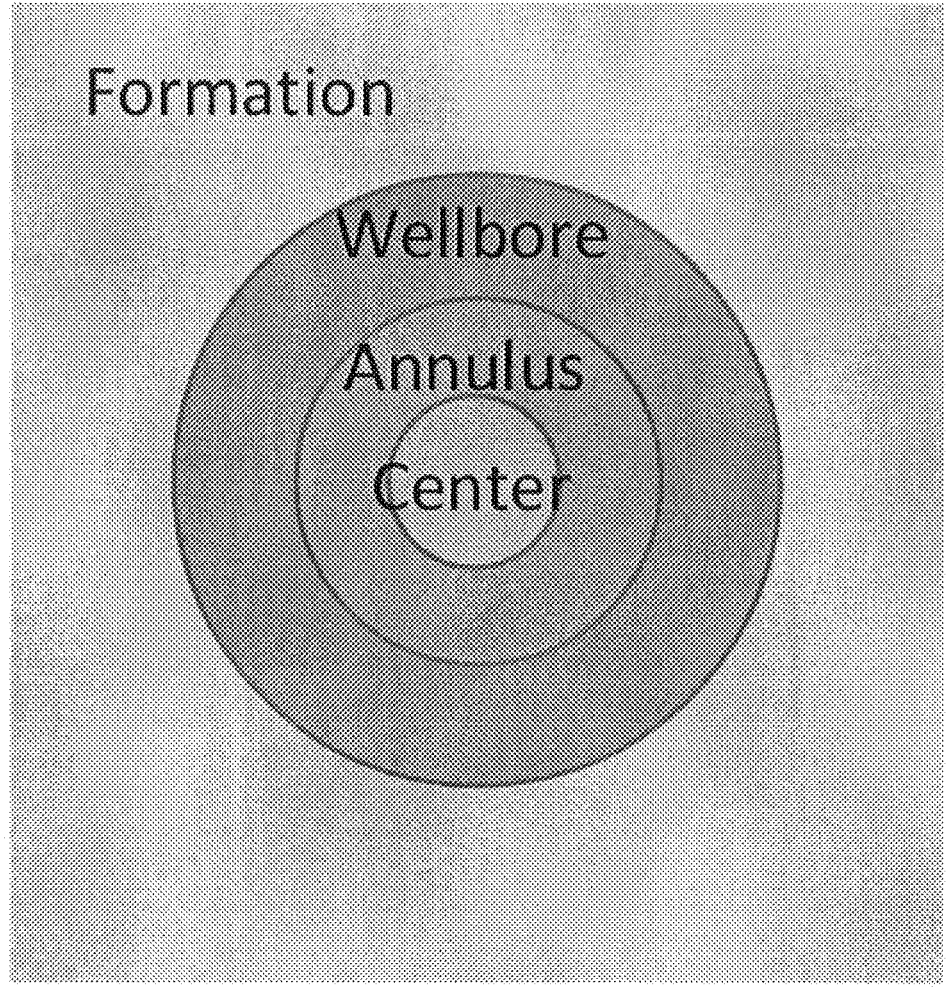
FIG. 8 is a schematic cross-sectional diagram of a preferred embodiment of the present invention.

Landers 1
  Drilled to a total depth (TD) of 7,705 feet (2,348 m); completed on Sep. 11, 1976. Flow tested on Sep. 28, 1976
  8⅝-inch production casing shoe at 5,966 feet (1,818 m) depth; 6⅝-inch slotted liner from 5,745 to 7,705 feet (1,751 to 2,348 m)
  25-minute duration production test results: 455,000 lbs/hr total mass flow; 350° F. (177° C.) fluid temperature; 80 psi-g wellhead pressure; 353 BTU/lb enthalpy
  Production test was terminated when well sanded up and died Landers 2
  Drilled to a TD of 7,507 feet (2,288 m); completed on Mar. 4, 1976. Flow tested on Mar. 9, 1976
  9⅝-inch production casing shoe at 5,947 feet (1,813 m) depth; 7-inch slotted liner from 5,965 to 7,507 feet (1,818 to 2,288 m)
  Eight-hour duration production test results: 210,782 lbs/hr total mass flow; 343° F. (173° C.) fluid temperature; 190 psi-g wellhead pressure; 21,000 lbs/hr steam at 5 psig separator pressure
  Total dissolved solids (TDS) of produced brine was 59,900 ppm Landers 3
  Drilled to a TD of 4,650 feet (1,417 m); completed on Oct. 24, 1976. Flow tested on Nov. 12, 1976
  9⅝-inch production casing shoe at 3,114 feet (949 m) depth; 7-inch slotted liner from 3,013 to 4,640 feet (918 to 1,417 m)
  Five-hour duration production test results: 583,000 lbs/hr total mass flow; 243° F. (117° C.) fluid temperature; 155 psi-g wellhead pressure; 211± btu/lb enthalpy To evaluate the efficiency of heat transfer from the reservoir fluid to the working fluid in the geothermal loop in-ground heat exchanger, a numerical model was designed using the multiphase fluid transient simulation software OLGA. The model was comprised of three concentric vertical pipes of varying diameters (FIG. 8). The reservoir fluid comes in at the bottom of the pipe, flows up through the annular space between the wellbore casing (the outermost pipe) and the shell (middle pipe), and leaves the wellbore at the surface. The geothermal loop in-ground heat exchanger working fluid is pumped down the annular space between the shell (middle pipe) and the center tube (innermost pipe). The heated working fluid then returns to the surface by flowing up through the center tube (innermost pipe).

The reservoir fluid, as it travels up the wellbore, transfers heat to the working fluid inside the geothermal loop in-ground heat exchanger as well as to the formation outside the wellbore casing. Similarly, the working fluid flowing down the annular space of the geothermal loop in-ground heat exchanger exchanges heat with the reservoir fluid outside the shell as well as with the returning heated working fluid inside the center tube.

Heat transfer in the numerical model is controlled by several parameters. These parameters that characterize the reservoir fluid, the working fluid, or the well configuration, are listed below and grouped accordingly. In addition, the thermal properties used in the model for the working fluid and the reservoir fluid are assumed to be those of pure water.
  Well Configuration
  Pipe materials (heat capacity, heat conductivity, density)
  Pipe diameters
  Pipe lengths
  Working Fluid
  Circulation rate
  Fluid inlet temperature
  Reservoir Fluid
  Reservoir temperature and Reservoir flow rate The numerical model assumed the heat transfer properties of carbon steel pipe.

A 16-inch diameter wellbore casing (0.4064 m outside diameter "OD", and 0.3731 m inside diameter "ID") was modelled. Assuming a 16-inch diameter wellbore, the geothermal loop in-ground heat exchanger was modelled with a 9⅝-inch outer pipe (0.2445 m OD and 0.2205 m ID) and a 5½-inch center tube (0.1397 m OD and 0.1214 m ID).

These pipe diameters were selected from standard pipe sizes to give reasonable annular flow areas for the reservoir fluid and the working fluid. The geothermal loop in-ground heat exchanger as modelled extended from the surface down to the bottom of the well. Furthermore, the wellbore and the geothermal loop in-ground heat exchanger were modelled with fixed diameters from the surface to the bottom of the well.

The base case model assumed a practical fluid velocity of approximately 1.5 m/s in the center tube, or a working fluid circulation rate of 15 kg/s. This working fluid was assumed to enter the geothermal loop in-ground heat exchanger at a temperature of 65° C., a return temperature typical of binary cycle plants, and kept in liquid phase by maintaining the back pressure at the discharge above the saturation pressure of the working fluid.

The reservoir flow characteristics used in the model were based on the results from various production tests of the Landers wells, shown in Table 1 provided later in this specification. The base case model assumed a reservoir production rate of 50 kg/s, the average flow rate of the three wells. A fluid entry temperature of 193° C. was used in the base case model. Although this temperature is equivalent to the highest observed discharge enthalpy from the test wells (Landers 1), it is still considered to be the best estimate of potential fluid temperature from the permeable zones. Landers 3 was relatively shallow and may not have encountered high temperature permeable zones. The moderate fluid entry temperature estimated for Landers 2 assumed a single permeable zone producing the fluid, when it may be that the produced fluid came from a mixture of fluid from more than one feed zones of differing temperatures. Based on the downhole temperatures measured from the wells, reservoir fluid at 193° C. is expected at a depth of 1,830 m. The base case assumed that the well is drilled to 1,830 m and produces fluid at a temperature of 193° C. and a rate of 50 kg/s.

Figure 9:
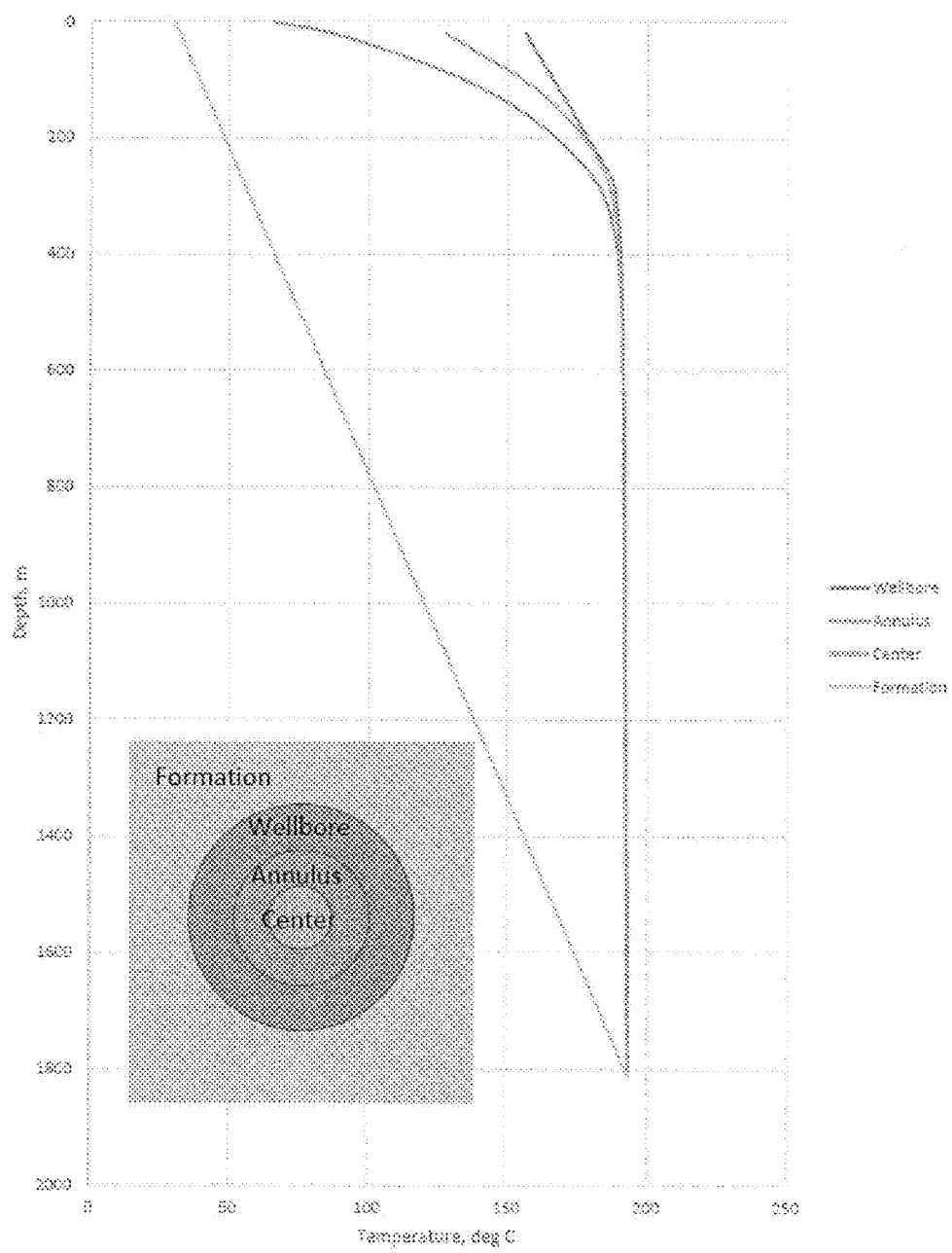
FIG. 9 is a graphical illustration of the simulated temperature profiles for the base case of the heat transfer model of a preferred embodiment.

The heat transfer model was run using the base case parameters previously described and the resulting fluid temperature profiles are shown in FIG. 9. The plot illustrates the temperature as a function of depth for the three pipe sections. The wellbore carries reservoir fluid to surface; the annulus carries cool working fluid downhole; and the center pipe carries heated working fluid back to surface. The key observations from the resulting temperature profiles of the base case are:

At the flow rates used in the base case, the working fluid heats up to within two degrees Celsius of the reservoir fluid temperature ("near-reservoir" temperature) after just 560 m length of the geothermal loop in-ground heat exchanger.

Heat transfer between the cool working fluid in the annulus of the geothermal loop in-ground heat exchanger and the heated working fluid returning through the center tube is significant in the upper portion of the geothermal loop in-ground heat exchanger. The working fluid that has been heated to reservoir fluid temperatures downhole loses most of this heat as it exchanges heat with the incoming cool working fluid at the upper portion of the well.

The reservoir fluid drops temperature as it flashes going up the wellbore (flashing starts at 240 m depth in the base case).

Figure 10:
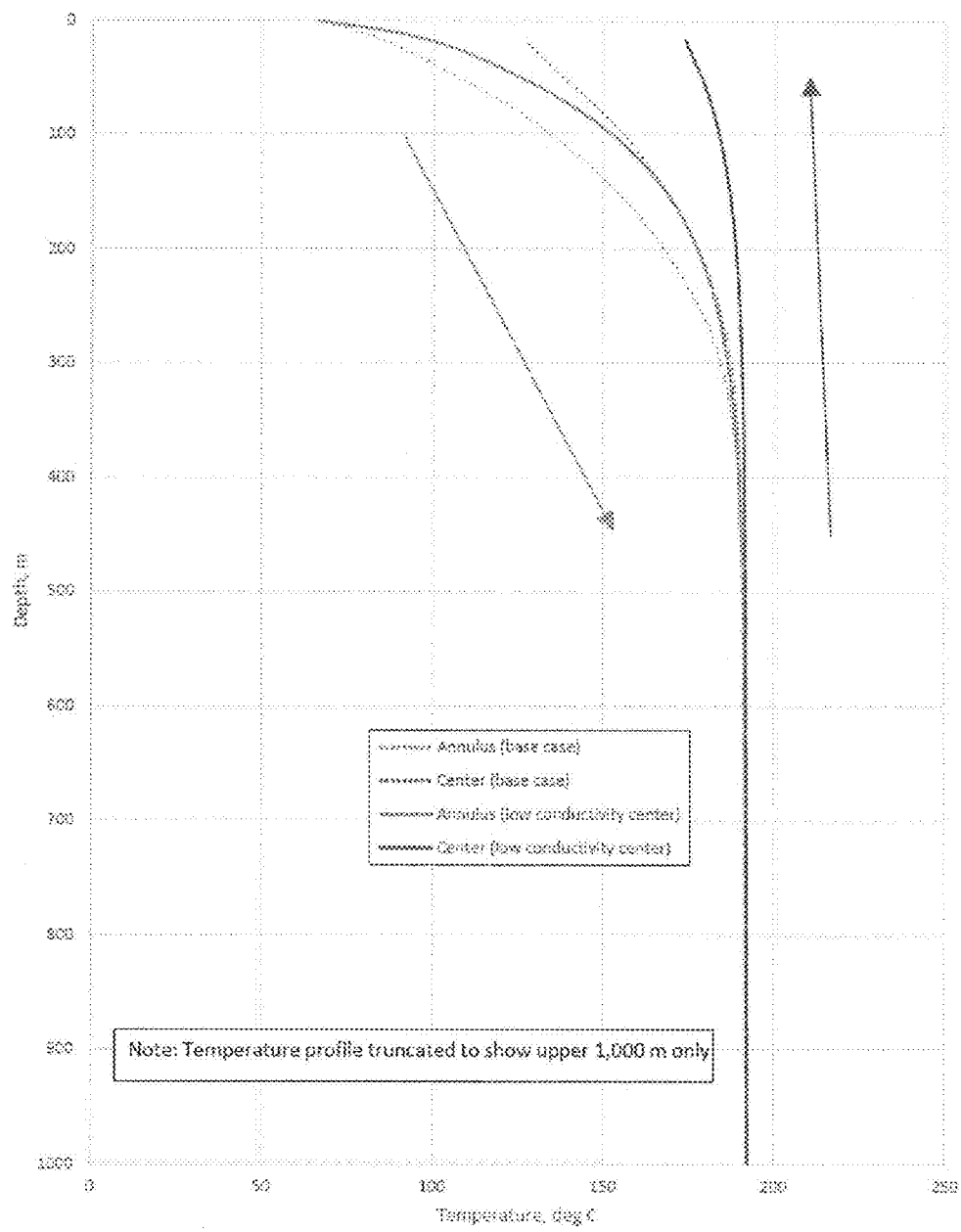
FIG. 10 is a graphical illustration of the simulated tempter profiles comparing the base case illustrated in FIG. 9 and the case using a lower conductivity center pipe.

The first observation suggests that the geothermal loop in-ground heat exchanger does not need to extend to the bottom of the well to heat the working fluid to near-reservoir temperatures. In addition to the direct economic benefits of a shorter geothermal loop in-ground heat exchanger, there are additional benefits in terms of wellbore design such as:

the wellbore portion below the geothermal loop in-ground heat exchanger will allow for a larger flow area for reservoir fluids the upper portion of the wellbore can be increased to use a larger diameter geothermal loop in-ground heat exchanger while keeping the deeper portion at a smaller, more cost-effective wellbore diameter the wellbore portion below the geothermal loop in-ground heat exchanger could be designed directionally, sidetracked, or designed to allow for multi-lateral completions to maximize reservoir fluid flow The second observation suggests that the center pipe for returning the heated working fluid to the surface should be insulated to prevent losing heat to the cooler fluid in the annulus of the geothermal loop in-ground heat exchanger. FIG. 10 shows the simulated temperature profile assuming that the center pipe is coated with a hypothetical material with a thermal conductivity of 1.8 W/m-K. The plot shows that by introducing a low conductivity material to the center pipe, heat exchange between the heated working fluid and the cool working fluid is significantly reduced, resulting in the exit working fluid temperature being almost 50° C. hotter than in the base case. Insulating materials with lower thermal conductivity than the value used above exist on the market that would offer even better thermal isolation. However, the applicability and selection of these materials were not specifically evaluated under the model, which simply illustrates the benefits of insulating the center pipe.

Other key conclusions from the resulting temperature profiles of the base case are:

At the well productivity used in the base case, thermal equilibrium between the wellbore fluid and the working fluid is reached at less than 2,000 ft. length of the geothermal loop in-ground heat exchanger.

The return line for the working fluid (i.e. the center pipe within the geothermal loop in-ground heat exchanger) should be insulated to prevent losing heat to the cooler fluid in the annulus of the geothermal loop in-ground heat exchanger The reservoir fluid drops temperature as it flashes going up the wellbore (flashing starts at 800 ft in the base case). Given the reservoir pressure in the area however, the well will likely not be able to produce unless it is flowed at a low wellhead pressure and allowed to flash.

A summary of important parameters used in the base case are:

Pipe Description:
  16-inch diameter wellbore—for flowing reservoir fluid to surface
  9⅝-inch diameter geothermal loop in-ground heat exchanger—for circulating the working fluid
  4½-inch diameter center pipe—for returning the heated working fluid to surface
  All of the pipe utilized heat transfer properties of carbon steel Reservoir Description:
  Feed depth: 6,000 ft (1,830 m)
  Reservoir fluid flow rate: 50 kg/s
  Reservoir Temperature: 193° C.

Working Fluid Description:
  Inlet Temperature: 65° C.
  Flow Rate: 15 kg/s

Reservoir fluid in the area of interest at the SE end of the Salton Sea exists in the liquid state. Producing the fluid while maintaining it in the liquid state has the benefit of keeping the heat of the fluid as sensible heat that could be transferred to the lower temperature working fluid. In addition, keeping the fluid in the liquid state may prevent potential scale formation inside the wellbore and outside the shell. Potential scale formation could impede reservoir flow, obstruct heat transfer, or both. Reservoir fluid, however, may only be produced and maintained in the liquid state if there is sufficient reservoir pressure. Data from the Landers 1 well suggests that the reservoir in the area of interest had a static water level at 250 m below the surface, and a pressure of 155 bar at a depth of 1,830 m. With this reservoir pressure, the potential wells will not be able to flow to surface unless part of the reservoir fluid vaporizes to reduce the hydraulic gradient, or some form of artificial lift is employed. Potential for scaling inside the wellbore casing and outside the shell is also a possibility and clean-out of this scale should be considered in the design of the geothermal loop in-ground heat exchanger.

Figure 11:
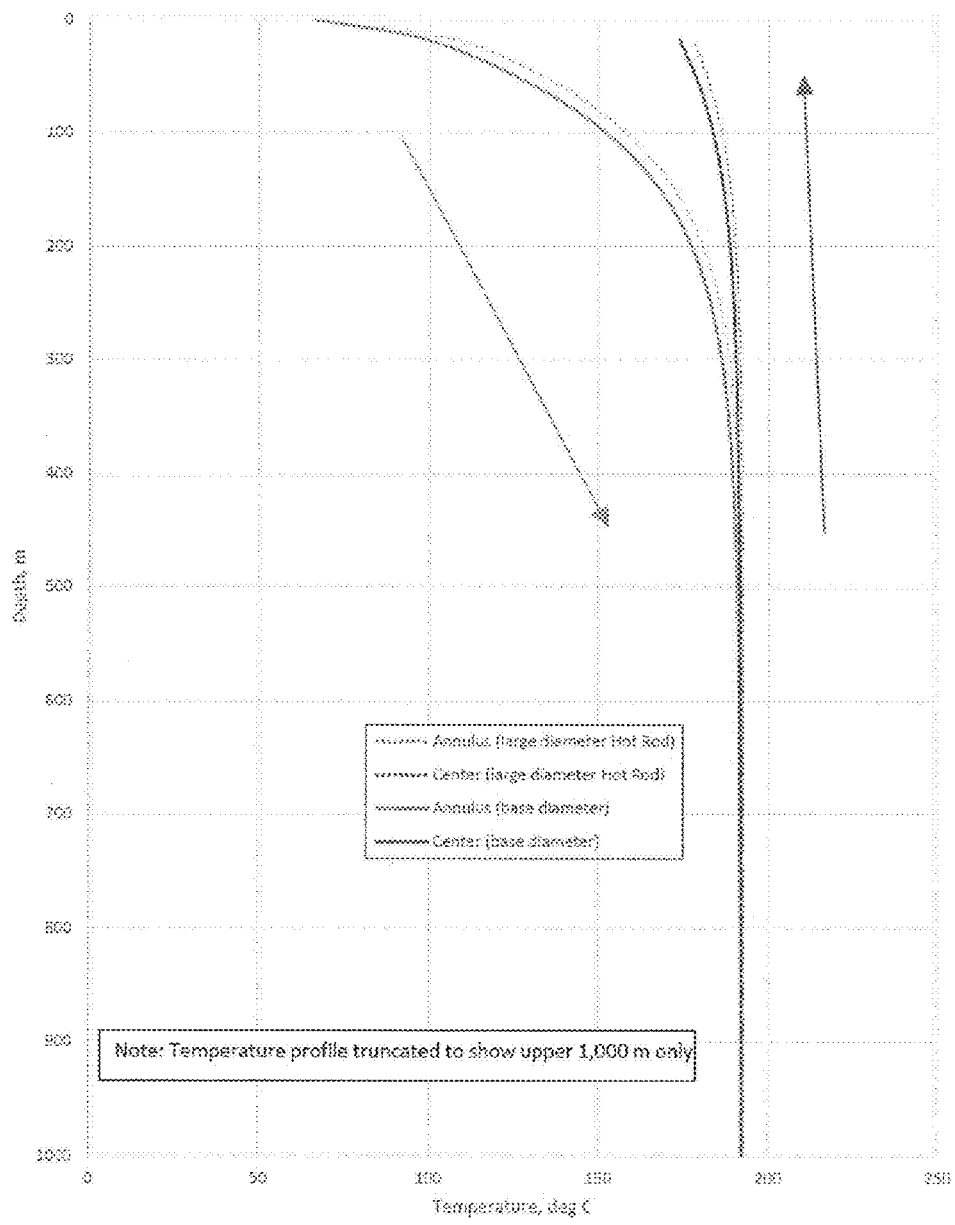
FIG. 11 is a graphical illustration of the simulated temperature profiles comparing the base case with a larger diameter example case.

A change in the pipe diameters will alter the corresponding area available to flow. This in turn will change the carrying capacity and pressure loss along the length of the pipes. The effect of changes in flow rate will be discussed independently below, and pressure losses have minimal effect on the heat transfer. A direct effect of increasing the shell diameter is an increase in the available heat transfer surface. FIG. 11 shows the simulated temperature profile assuming that the shell is increased from a 9⅝-inch to a 13⅜-inch diameter pipe. With the larger diameter, heat transfer occurs at a slightly faster rate as illustrated by the slight shift of the temperature curves to the right. The hotter temperatures in the annular space of the geothermal loop in-ground heat exchanger in turn, reduce the heat loss in the center pipes resulting in an exit temperature of the working fluid approximately four degrees Celsius hotter. This illustrates that even at pipe diameters with minimal clearance between wellbore casing and shell (resulting in unrealistic pressure losses on the wellbore side) the temperature gain is minimal.

It must be noted that both cases illustrated in FIG. 11 assume that the center pipe has a layer of material with low thermal conductivity properties. This was also the case for subsequent comparisons. This is necessary because the large thermal exchange near the surface between the cool working fluid and the returning hot working fluid (as seen in the base case) masks the effects of adjusting the individual parameters.

The length of the geothermal loop in-ground heat exchanger determines the total area available for heat transfer. As illustrated in FIG. 9, and discussed previously, the geothermal loop in-ground heat exchanger does not need to extend the full length of the wellbore to efficiently transfer heat. The driving force behind heat transfer is the temperature difference between the two materials. As the temperatures of the two materials get closer, the rate of heat transfer decreases. There is therefore a practical length in a countercurrent heat exchanger such as the geothermal loop in-ground heat exchanger, beyond which no appreciable heat transfer will occur.

Figure 12:
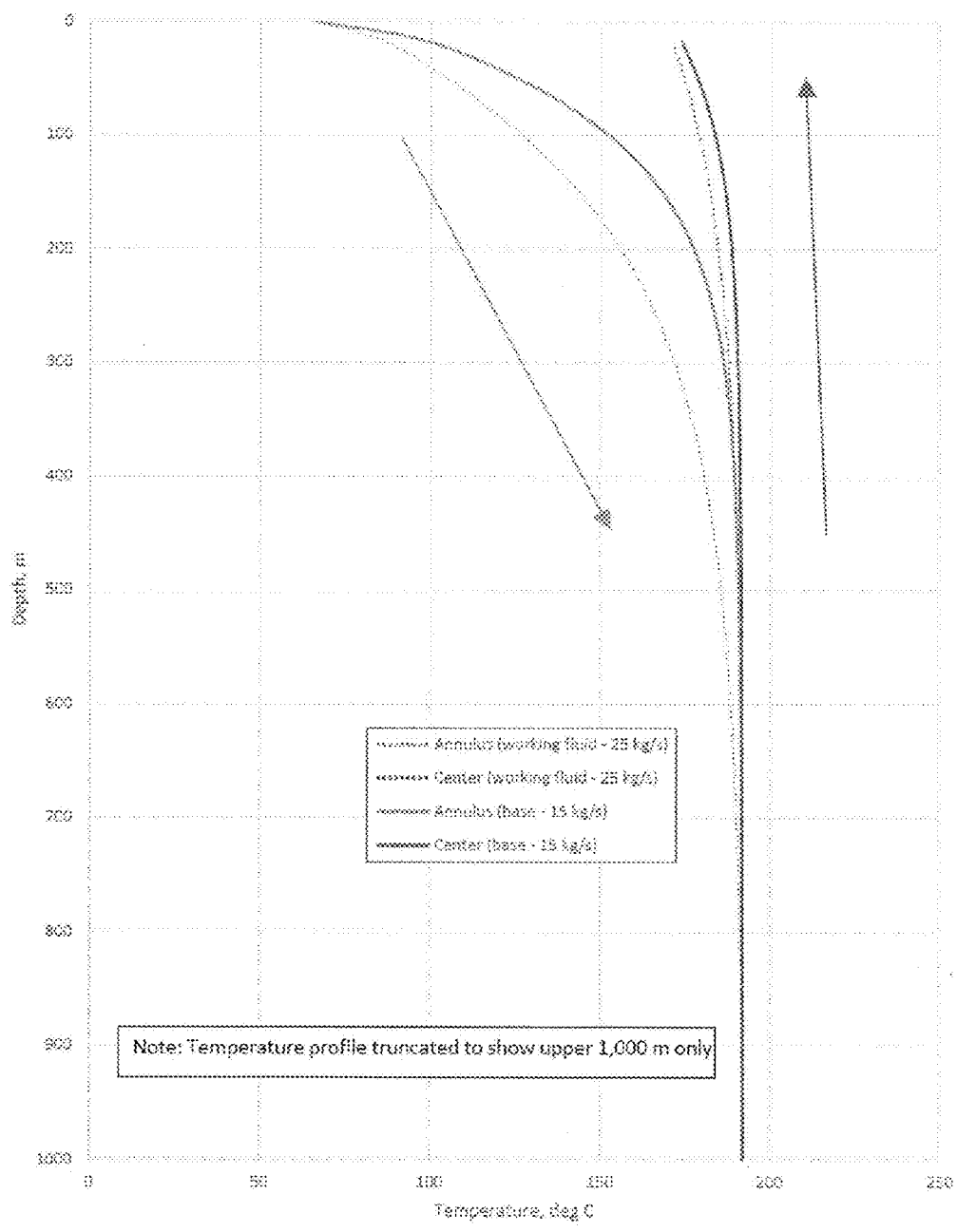
FIG. 12 is a graphical illustration of the simulated temper to profiles comparing the base case circulation rate with a larger circulation rate.

The working fluid circulation rate used in the base case was calculated on a fluid velocity of approximately 1.5 m/s in the center tube. One of the limits considered for fluid velocity in pipes is the erosional velocity, which is the speed at which particles in the stream are accelerated to a point where they can cause damage to the pipe walls. Therefore, to avoid damaging the pipe, fluid velocity should not exceed the erosional velocity. For a 5½-inch diameter carbon steel pipe, a typical manufacturer limit is 2.4 m/s. This corresponds to a fluid circulation rate of approximately 25 kg/s. FIG. 12 compares the temperature profiles for the base circulation rate of 15 kg/s and the larger rate of 25 kg/s. The plot shows that the larger amount of working fluid circulating increases temperature at a slower rate and requires a longer length of geothermal loop in-ground heat exchanger for the working fluid to heat up to near-reservoir temperatures. This cooler temperature on the annulus side of the geothermal loop in-ground heat exchanger makes the exit temperature of the working fluid at the larger circulation rate marginally cooler. This minimal difference, however, is overshadowed by the fact that nearly twice as much fluid is circulating and bringing heat to the surface. It should be noted that a more detailed analysis with known specific pipe characteristics could be undertaken to better understand the maximum circulation rate that can be used in the geothermal loop in-ground heat exchanger. Using stainless steel pipe for example, may allow circulation rates of up to three times those allowable for carbon steel pipe.

Figure 13:
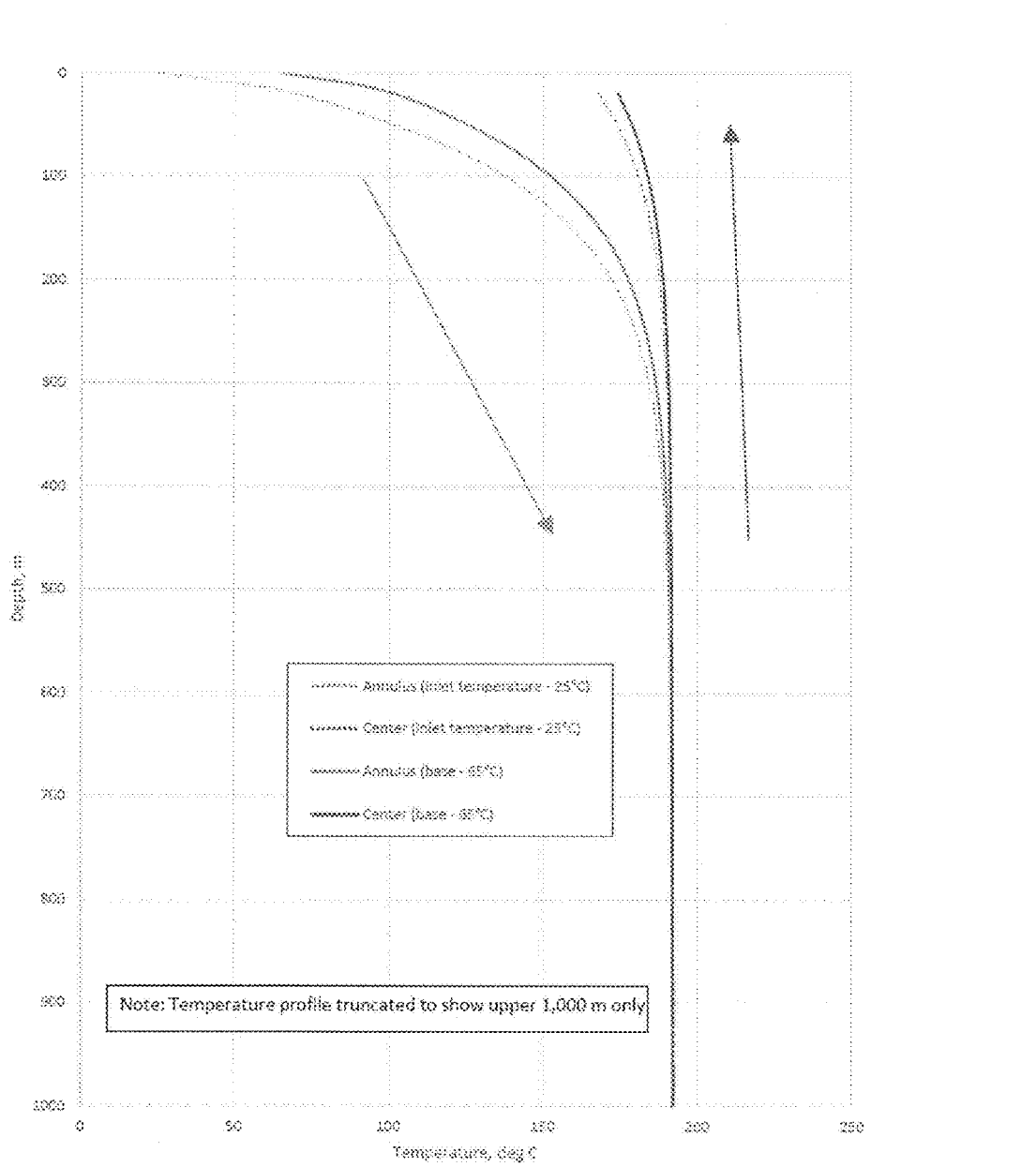
FIG. 13 is a graphical illustration of the simulated temperature profiles comparing the base case inlet temperature with a lower inlet temperature.

In the base case, the working fluid was assumed to enter the geothermal loop in-ground heat exchanger at a temperature of 65° C., and the heat transfer model (with the low conductivity center pipe) simulated an exit temperature from the geothermal loop in-ground heat exchanger of 173° C., or an increase in temperature of 108° C. FIG. 13 shows this temperature profile together with the results of a simulation assuming an inlet temperature of 25° C. With an inlet working fluid temperature of 25° C., the exit temperature slightly decreases to 168° C., or a temperature increase of 143° C. The temperature profiles in FIG. 13 show that the cooler inlet temperature requires nearly the same length of the geothermal loop in-ground heat exchanger for the working fluid to reach near-reservoir temperatures. This is because the larger temperature difference between the cool working fluid and the wellbore fluid increases the rate of heat transfer. At practically the same length of the geothermal loop in-ground heat exchanger, a lower inlet temperature going to the geothermal loop in-ground heat exchanger will maximize the amount of heat extracted from the wellbore fluid.

Figure 14:
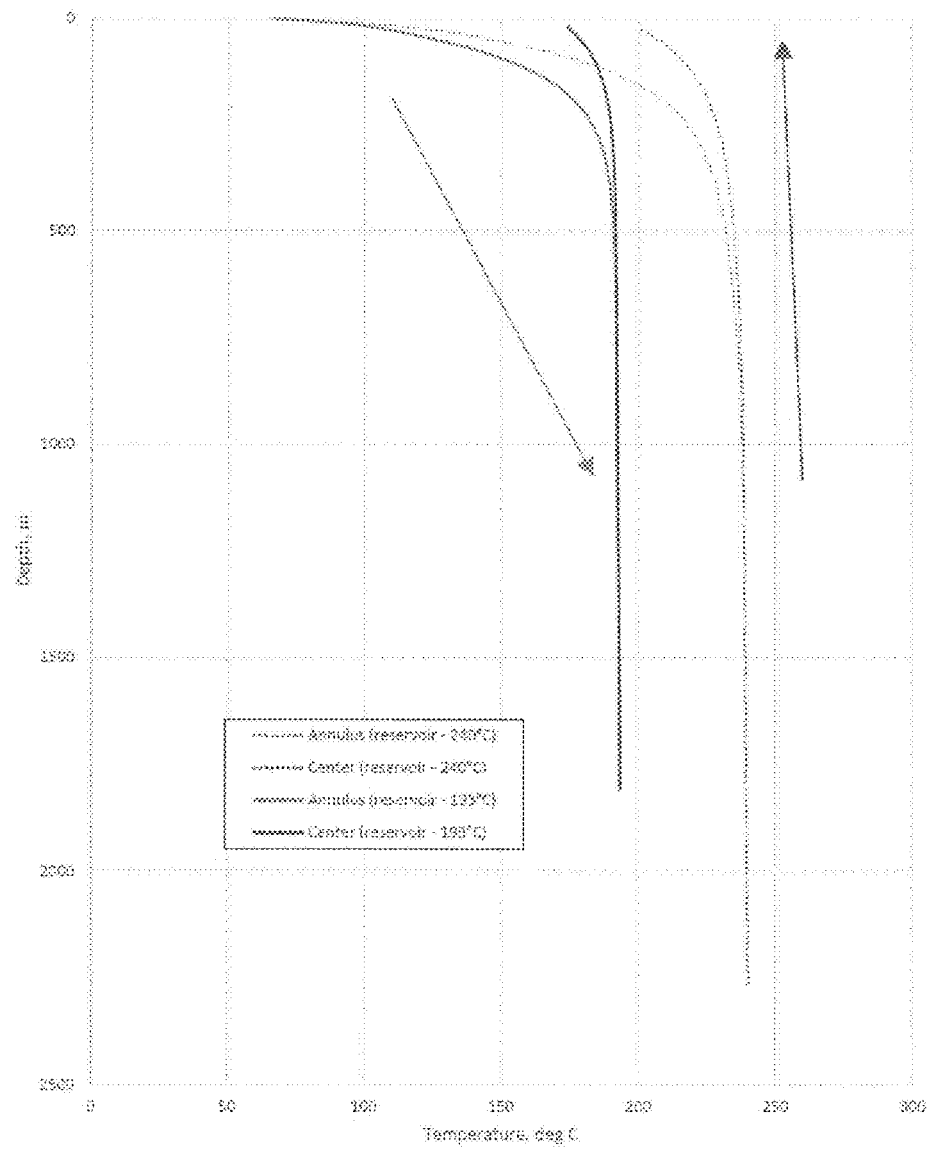
FIG. 14 is a graphical illustration of the simulated temper to profiles comparing the base case reservoir temperature with a higher reservoir temperature.

The expected reservoir fluid temperature used in the base case was 193° C. This was based on actual produced fluid data measured from the Landers wells and estimated to come from permeable zones at a depth of 1,830 m. The measured downhole temperatures from the Landers wells indicate that at a depth of 2,300 m, the expected temperature is 240° C. Although the formation temperature can be extrapolated to estimate temperatures at deeper depths, there is no guarantee that the reservoir will have sufficient capacity for flow as permeability generally decreases with depth. The area of interest, west of the Landers wells, is closer to the Salton Sea KGRA. It is possible that in this location there are potential drilling targets and permeable zones that can produce 240° C. reservoir fluids at sufficient flow rates. FIG. 14 shows the simulated temperature profile for this case in comparison with the base case. The plot shows that with the higher reservoir fluid temperature, a longer length of the geothermal loop in-ground heat exchanger is required for the working fluid to reach near-reservoir temperatures. The plot also shows that because of the higher temperature difference between the reservoir fluid and the inlet temperature of the working fluid, a larger amount of heat is lost as the working fluid returns through the center pipe, with the fluid temperature dropping from 240° C. to just 200° C. at the surface. Both cases in FIG. 14 were run with the hypothetical low conductivity insulation on the center pipe. The case with the higher reservoir temperature shows that it will benefit from the use of pipe insulation with lower thermal conductivity.

Figure 15:
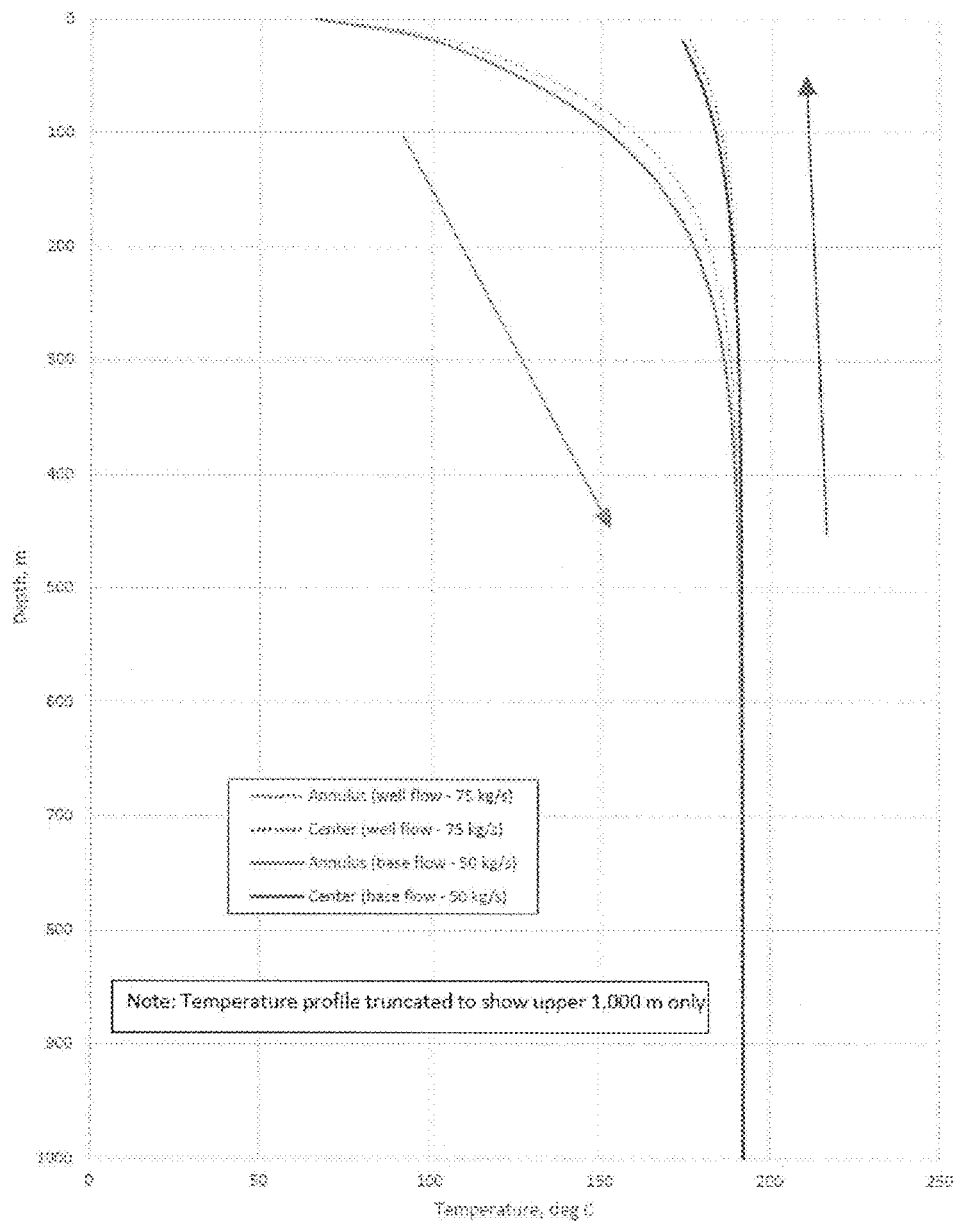
FIG. 15 is a graphical illustration of the simulated temper to profiles comparing the base case reservoir flow rate with a higher reservoir flow rate.

The measured flow test data from the Landers wells (Table 1) shows production rates ranging from 26.6 kg/s to 73.6 kg/s. FIG. 15 shows the simulated temperature profile at a reservoir flow rate of 75 kg/s, in comparison with the base case at a reservoir flow rate of 50 kg/s. The plot shows that with the higher reservoir fluid flow rate, heat is transferred at a faster rate as indicated by the shift of the temperature profiles to the right. However, these differences in temperature appear marginal and the lengths of the geothermal loop in-ground heat exchanger required for the respective working fluids to heat up to near-reservoir temperatures is only reduced by 100 m with the higher reservoir fluid production rate. These results indicate that, at the conditions used in the base case, an increase in the wellbore production rate will not appreciably increase the temperature output of the geothermal loop in-ground heat exchanger working fluid, nor will it shorten the requirements for the geothermal loop in-ground heat exchanger length significantly.

TABLE 1

Summary of production tests on Landers wells

| Well | Total Mass Rate kg/s | Fluid Enthalpy kJ/kg | Fluid Entry Temp* ° C. | Comments |
|---|---|---|---|---|
| Landers 1 | 57.4 | 821 | 193 | Test terminated when well sanded and died |
| Landers 2 | 26.6 | 675** | 160 | Total dissolved solids (TDS) of produced brine was 59,900 ppm |
| Landers 3 | 73.6 | 491 | 117 | Only drilled to a total depth of 1,417 m (4,650 ft) |

*Assuming single liquid-phase feed zone
**Landers 2 enthalpy calculated from steam fraction (12,000/210,782) = 0.010 at 5 psig separation A second heat transfer simulation of the geothermal loop in-ground heat exchanger was completed on a well with a 38-inch casing that extends from the surface to a depth of 600 m, and a 16-inch production liner from 600 m to 2,286 m (the total depth of the well). The results indicate that although the larger diameter casing can accommodate a geothermal loop in-ground heat exchanger capable of circulating the working fluid at high flow rates, the extraction of heat from the reservoir fluid is limited to approximately 25 kg/s. Circulating the working fluid at flow rates greater than 25 kg/s extracts too much energy from the reservoir fluid and the well ceases to flow. The simulations also show that scaling in the wellbore is a significant concern when the reservoir fluids flash at working fluid circulation rates below 17 kg/s. At circulation rates above this and depending on the reservoir fluid chemistry, the reservoir fluid may still be cooled to an extent where scaling still presents a concern.

Based on the findings and limitations discussed above, an additional scenario was modeled based on larger pipe diameters and expectations of encountering deeper and hotter reservoir fluids. This simulation was intended mainly to investigate the benefits of increasing the working fluid circulation rate in the geothermal loop in-ground heat exchanger.

Figure 16:
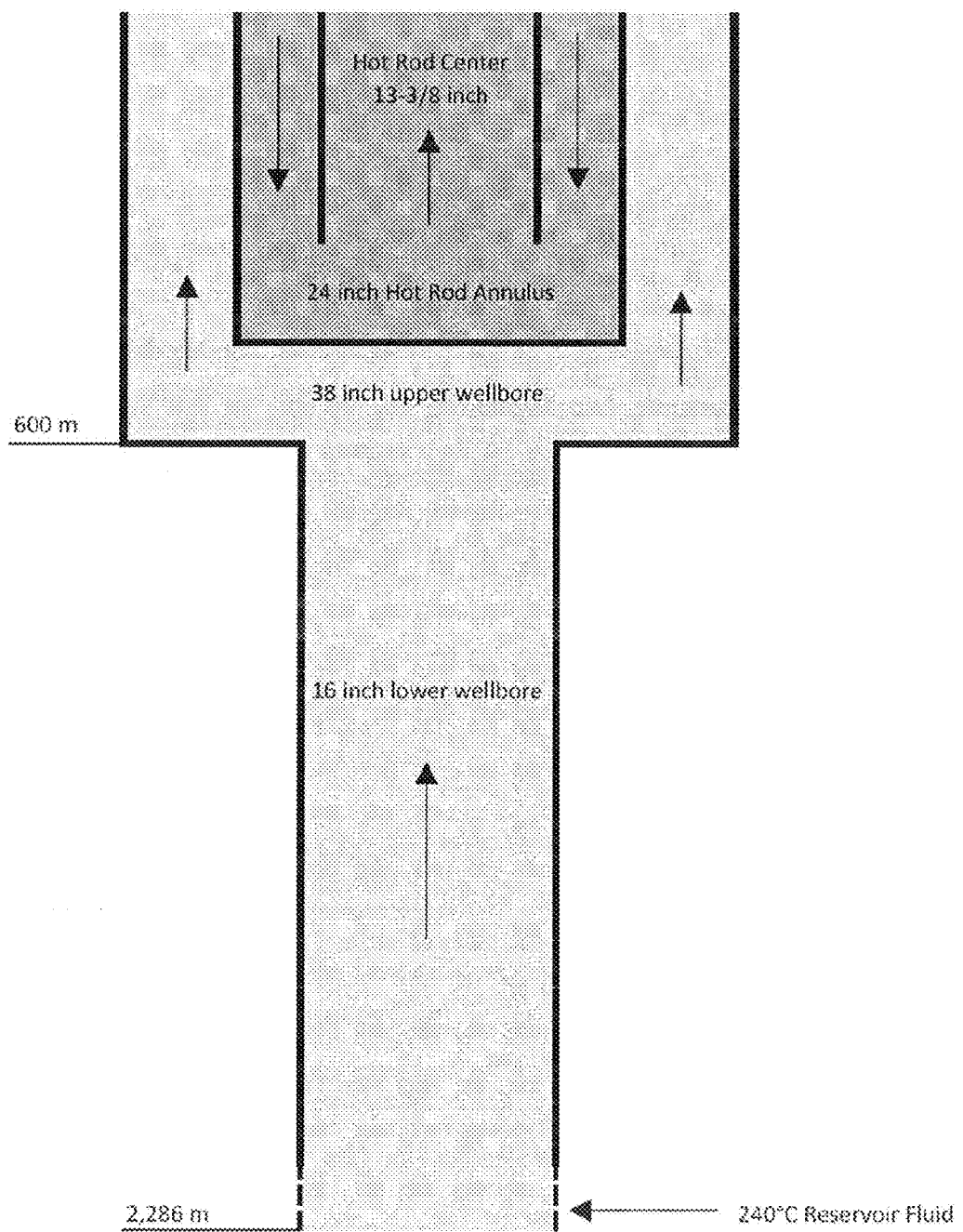
FIG. 16 is a schematic illustration of an alternative configuration of an in ground heat exchanger.

FIG. 16 illustrates the dimensions of the wellbore and geothermal loop in-ground heat exchanger used in this heat-transfer model. The well has a 38-inch casing that extends from the surface to a depth of 600 m, and a 16-inch production liner from 600 m to 2,286 m (the total depth of the well). The geothermal loop in-ground heat exchanger extends from the surface down to 600 m, and was modelled with a 24-inch outer pipe and a 13⅜-inch center tube. The reservoir fluid was assumed to enter the wellbore at a temperature of 240° C. at a depth of 2,286 m. The Productivity Index (PI) of the permeable zone was assumed to be 3.7 kg/s per bar. The PI is the amount of flow obtained for a given difference between the reservoir pressure and the pressure inside the wellbore.

Figure 17:
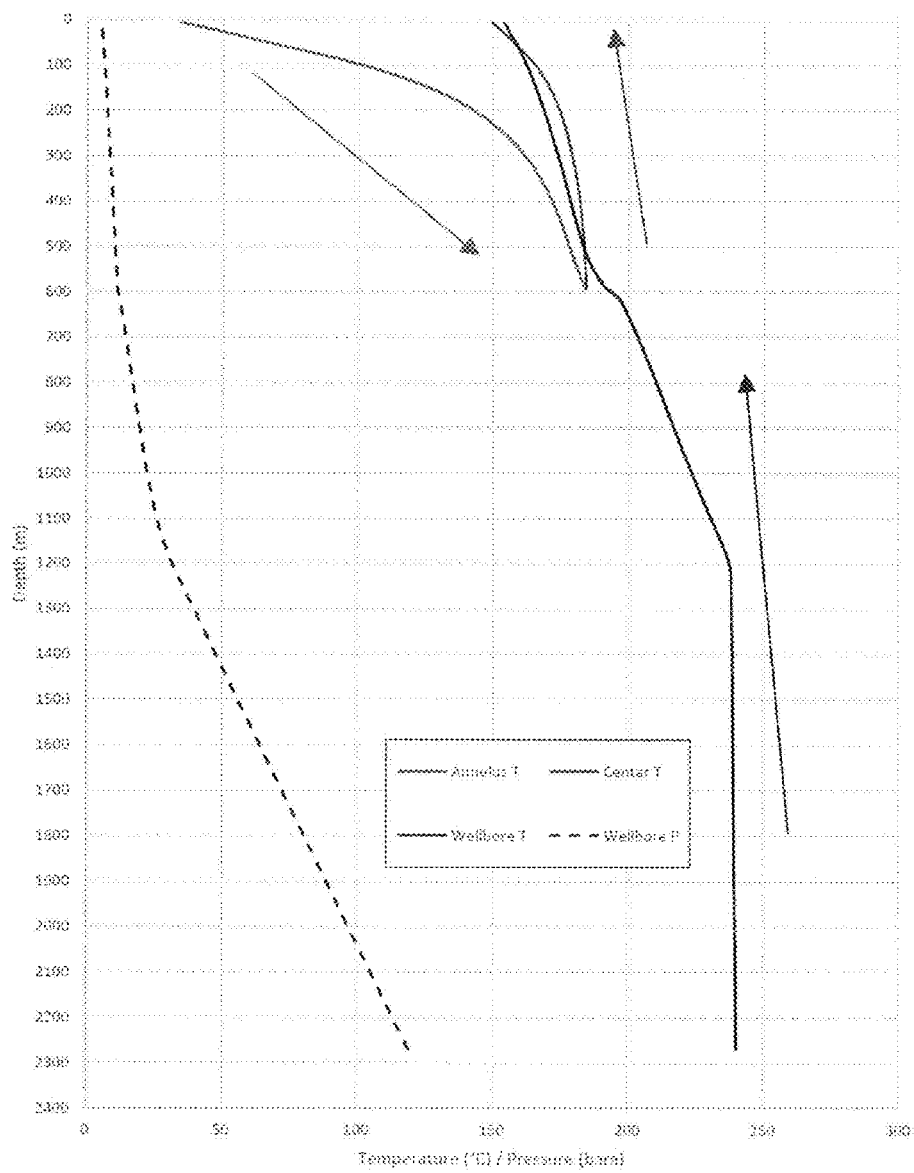
FIG. 17 is a graphical illustration of the simulated temperature and pressure profiles for a working fluid circulation rate of 15 kg per second in the heat exchanger configuration illustrated in FIG. 16.

FIG. 17 illustrates the simulated fluid conditions inside the wellbore and inside the geothermal loop in-ground heat exchanger at a working fluid circulation rate of 15 kg/s, and a reservoir fluid discharge pressure of 5 bara at the wellhead. The plot illustrates the temperature as a function of depth for the three pipe sections, as well as the pressure in the wellbore. The wellbore carries reservoir fluid to surface; the annulus carries cool working fluid downhole; and the center pipe carries heated working fluid back to surface. The key observations from the resulting temperature and pressure profiles are:

Under the assumed conditions, the geothermal loop in-ground heat exchanger requires more than 600 m for the working fluid reservoir to heat up to a near-reservoir temperature level.

Even with a low-conductivity material surrounding the center pipe, the working fluid temperature still drops by 35° C. as it moves from the bottom of the geothermal loop in-ground heat exchanger to the surface.

The reservoir fluid comes into the wellbore as a liquid at a temperature of 240° C. However, as the reservoir fluid moves up the wellbore, the fluid pressure is reduced and part of the reservoir fluid turns to steam. This is indicated in FIG. 17 by the change in slope of the temperature and pressure of the wellbore fluid at a depth of approximately 1,200 m.

Figure 18:
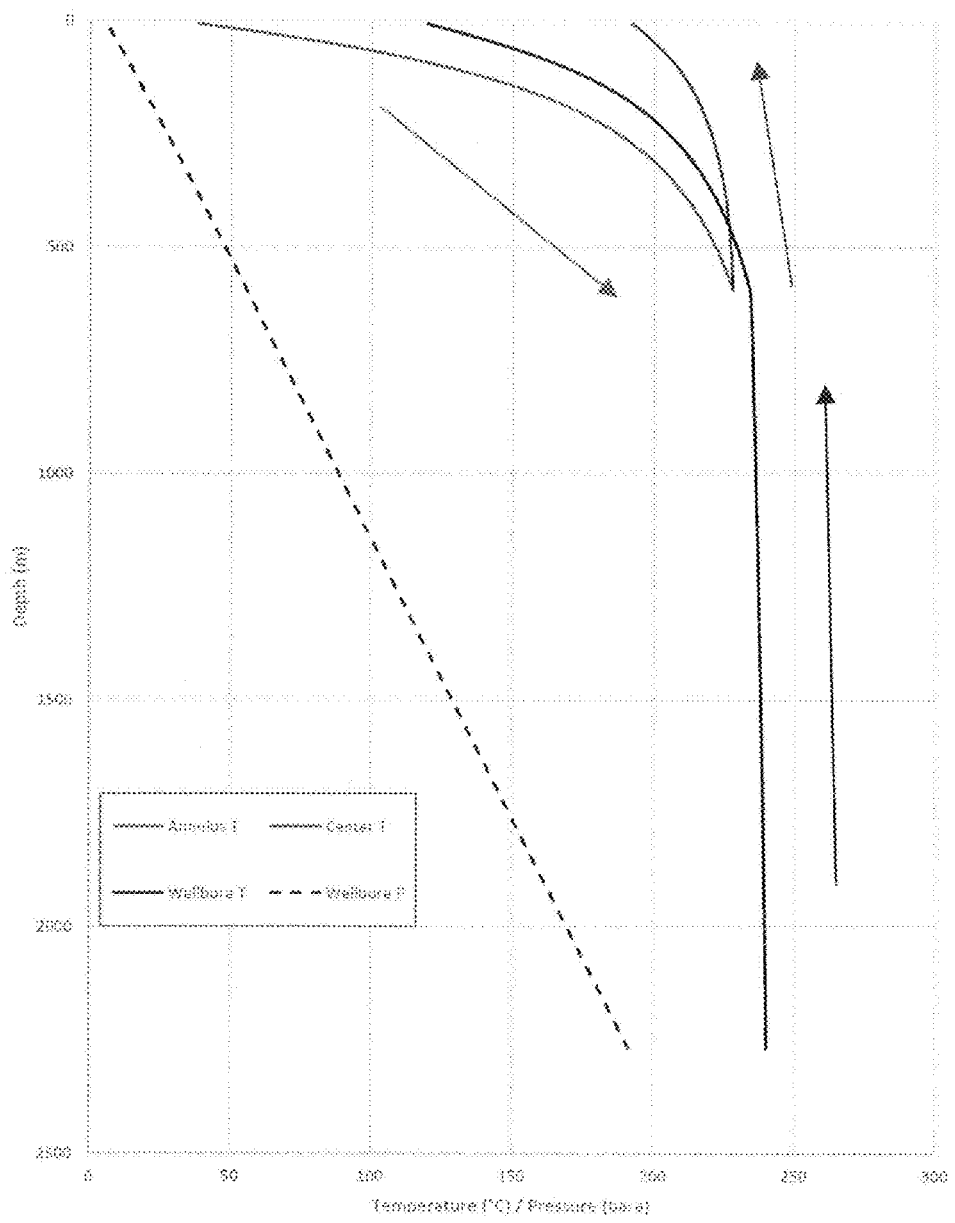
FIG. 18 is a graphical illustration of the simulated temperature and pressure profiles for a working fluid circulation rate of 20 kg per second in the heat exchanger configuration illustrated in FIG. 16.

FIG. 18 illustrates the simulated fluid conditions inside the wellbore and inside the geothermal loop in-ground heat exchanger at an increased working fluid circulation rate of 20 kg/s, with all the other parameters in the model identical to those used to generate the results shown in FIG. 17. The key observations from the resulting temperature and pressure profiles are:

The reservoir fluid remained liquid throughout the wellbore. The increased circulation rate of the working fluid allowed more heat to transfer from the reservoir fluid to the working fluid in the geothermal loop in-ground heat exchanger. This increased heat removal from the reservoir fluid prevented the reservoir fluid from turning to steam.

The presence of liquid throughout the wellbore increased the wellbore pressure at the bottom of the well to 190 bara (compared to 120 bara from FIG. 17).

The simulation model described above was conducted at different working fluid circulation rates and the results are presented in Table 2 as follows:

| Working Fluid | | Reservoir Fluid |
|---|---|---|
| Circulation Rate kg/s | Exit Temperature deg C. | Exit Temperature deg C. |
| 0 | 148 | 155 |
| 5 | 148 | 154 |
| 10 | 155 | 154 |
| 15 | 149 | 154 |
| 16 | 149 | 154 |
| 17 | 190 | 126 |
| 20 | 183 | 107 |
| 23 | 171 | 84 |
| 24 | 162 | 73 |

At working fluid circulation rates below 17 kg/s, the reservoir fluid retains enough energy to flash to steam and the pressure and temperature profiles in the wellbore are similar to FIG. 17. Because of the lower temperature of the reservoir fluid when it starts generating steam, the working fluid is exposed to much lower temperatures compared to the 240° C. fluid entry temperature and the working fluid exit the geothermal loop in-ground heat exchanger at an average temperature of only 150° C.

At a working fluid circulation rate of 17 kg/s and greater, sufficient energy is extracted by the geothermal loop in-ground heat exchanger to keep the reservoir fluid from forming steam and the pressure and temperature profiles in the wellbore are similar to FIG. 18. Because the reservoir fluid does not utilize any of the heat to turn to steam, it remains at nearly the same temperature as it travels from the bottom of the well to the geothermal loop in-ground heat exchanger, and the temperature of working fluid as it exits the geothermal loop in-ground heat exchanger is significantly higher.

When the working fluid circulation rate is increased above 17 kg/s more heat is extracted from the reservoir fluid. As the reservoir fluid is cooled by the increased heat extraction, the reservoir fluid density increases and the wellbore pressure across the production zone increases. The increased wellbore pressure in turn, reduces the amount of fluid flowing from the reservoir. At a working fluid circulation rate of 25 kg/s, the wellbore pressure across the production zone equals the reservoir pressure and flow from the reservoir ceases.

The working fluid circulation rate limit at which the reservoir fluid flow ceases is dependent on the reservoir pressure, reservoir fluid temperature, reservoir Productivity Index, and wellbore configuration. Additional simulation runs were completed with different parameters (from average to optimistic values for the targeted area near the Salton Sea) with similar results of the reservoir fluid ceasing to flow at 20 to 25 kg/s working fluid circulation rate.

Figure 19:
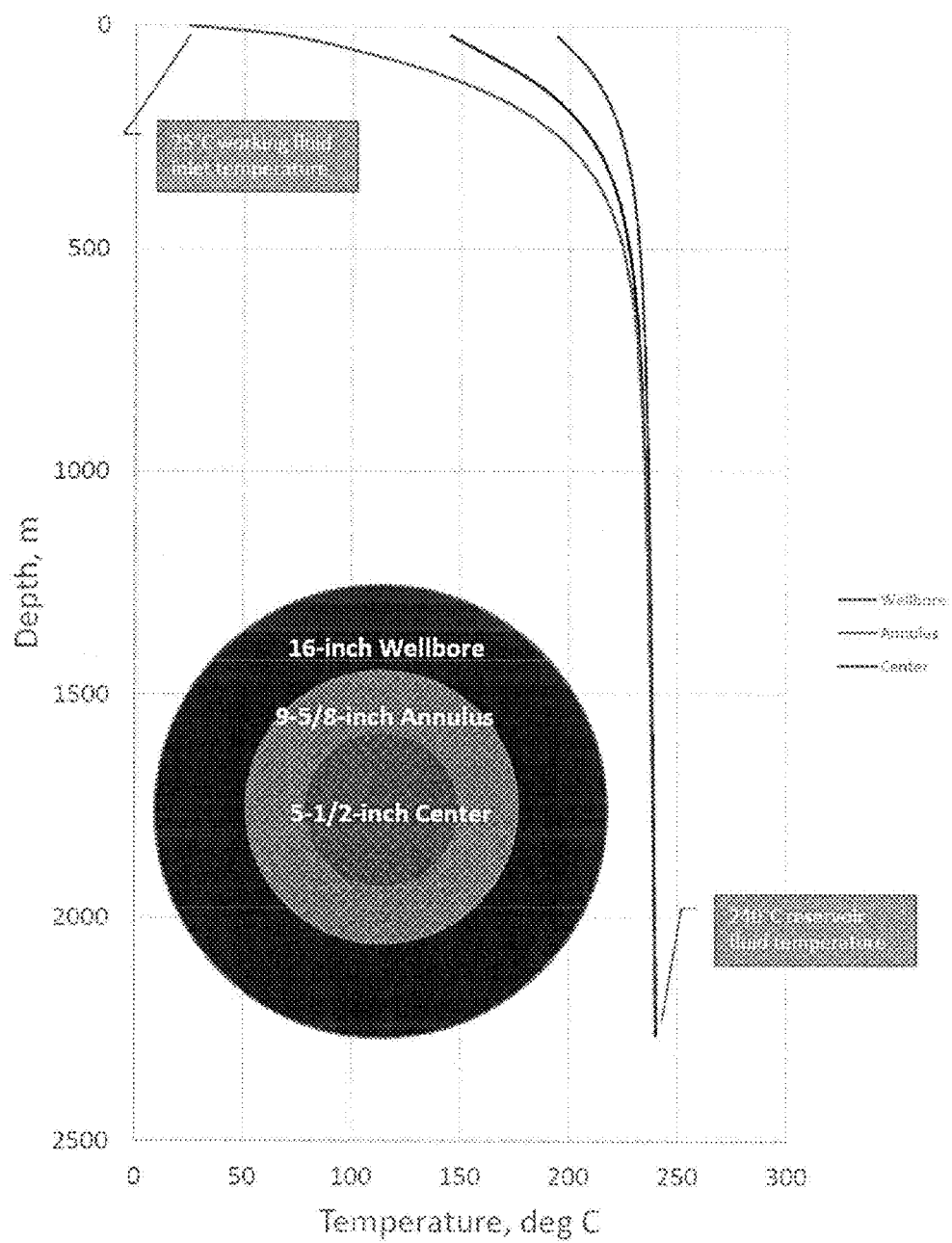
FIG. 19 is a graphical illustration of the simulated temperature profiles for a 16 inch wellbore according to a preferred embodiment of the present invention.

Illustrated in FIG. 19 is the temperature profile using the wellbore configuration described in the base case above assuming 25° C. working fluid inlet and 240° C. reservoir temperature. In this case, the working fluid in the annulus heats up to 230° C. by 660 m depth, 235° C. by 1,070 m depth, and 238° C. by 1,630 m depth. In addition to being dependent on reservoir fluid temperature and reservoir productivity, the optimum economic depth of the geothermal loop in-ground heat exchanger depends on the cost of the geothermal loop in-ground heat exchanger and its installation, versus the benefits of additional power/efficiency from the increased working fluid exit temperature.

Figure 20:
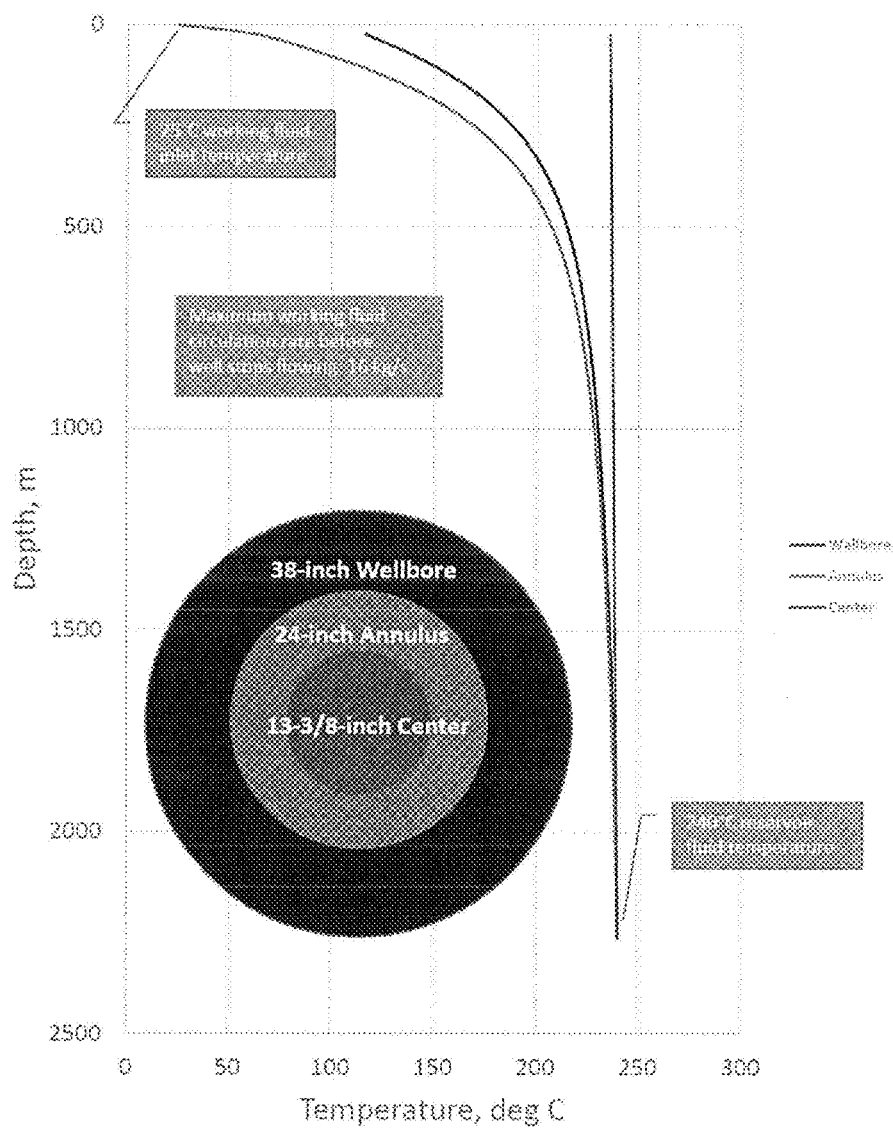
FIG. 20 is a graphical illustration of the simulated temperature profiles for a 38 inch wellbore within nonconductive centre pipe according to a preferred embodiment of the present invention.

Illustrated in FIG. 20 is the result of simulating the heat transfer in a large-diameter wellbore (38-inch down to 2,286 m) with a 24-inch geothermal loop in-ground heat exchanger in place. Further, the 13⅜-inch center pipe that returns the heated working fluid to the surface is assumed to be non-conductive. The working fluid is assumed to enter the geothermal loop in-ground heat exchanger at 25° C. and the resource fluid is assumed to be at 240° C. In this case, the working fluid in the annulus heats up to 230° C. by 1,100 m depth, 235° C. by 1,490 m depth, and 238° C. by 1,880 m depth.

The depths at which the working fluid heats up to predefined temperatures are slightly deeper because the hot working fluid in the assumed non-conductive center pipe does not lose any heat to the cool working fluid in the annulus.

Illustrated in Table 2.3 below is a summary of the maximum circulation rates that can be used before the working fluid extracts too much energy from the reservoir fluid and the well ceases to flow. The simulations used below assumed a reservoir fluid temperature of 240° C. The thermal energy gain is calculated by multiplying the circulation rate by the difference in outlet and inlet enthalpies.

| Wellbore configuration | Maximum Circulation Rate* kg/s | Inlet Temperature deg C. | Outlet Temperature deg C. | Inlet Enthalpy kJ/kg | Outlet Enthalpy kJ/kg | Thermal Energy Gain kJ/s |
|---|---|---|---|---|---|---|
| 38-inch to 600 m; low conductivity center pipe | 24 | 25 | 162 | 105 | 686 | 13958 |
| 38-inch to 2,286 m; low conductivity center pipe | 20 | 25 | 179 | 105 | 757 | 13045 |
| 38-inch to 2,286 m; non-conductive center pipe | 16 | 25 | 240 | 105 | 1038 | 14926 |

*maximum working fluid circulation rate before the well ceases to flow

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A geothermal loop in-ground heat exchanger for energy extraction including:
    an outer tubular casing bounded by a horizontal lower wall and an inner tubular portion spaced from the outer tubular casing to define an intervening injection space between the outer tubular casing and the inner tubular portion;
    wherein a working fluid is injected into the injection space at a first temperature, $T_1$, while the heat exchanger is located in a geothermal heat reservoir and the working fluid exits through the inner tubular portion at a second temperature, $T_2$, which is greater than $T_1$;
    a counter current heat shell is provided external to the outer tubular casing to enhance heat transfer to the working fluid;
    wherein the counter current heat shell is an annular shell, closed at an upper end by a transverse upper wall and having a lower end, the countercurrent heat shell bounded laterally by a vertical side wall;
    a reinjection port located on the vertical side wall below the transverse upper wall of the counter current heat shell;
    entry openings are spaced evenly over the length of the counter current heat shell between the lower end of the countercurrent heat shell and the reinjection port; and
    wherein the reinjection port allows a heat carrier to exit the counter current heat shell and the entry openings allow the heat carrier to enter the counter current heat shell.

2. The geothermal loop in-ground heat exchanger as claimed in claim 1 wherein a well bore houses the heat exchanger into which the working fluid is injected from the ground surface into the injection space such that heat is laterally transferred from the geothermal heat reservoir across the outer tubular casing of heat exchanger to the working fluid.

3. The geothermal loop in-ground heat exchanger as claimed in claim 1 wherein the heat exchanger is sized to provide sufficient contact area with the working fluid to partially or completely vaporize the working fluid.

4. The geothermal loop in-ground heat exchanger as claimed in claim 1 wherein the inner tubular portion is partially insulated in an upper zone of the heat exchanger to mitigate heat loss to the injection space.

5. The geothermal loop in-ground heat exchanger as claimed in claim 1 wherein mechanical supports are provided between the inner tubular portion and the outer tubular casing allowing the inner tubular portion to expand and contract independently of the outer tubular casing.

6. The geothermal loop in-ground heat exchanger as claimed in claim 1 wherein a lower end of the inner tubular portion is open and spaced from the horizontal lower wall of the outer tubular casing in order to provide an inversion space to allow the working fluid to enter the inner tubular portion from the injection space.

7. The geothermal loop in-ground heat exchanger as claimed in claim 1 wherein the counter current heat shell is a cylindrical shape.

8. The geothermal loop in-ground heat exchanger as claimed in claim 1 wherein the reinjection port is coupled to an elongate conduit in order to return spent or depleted heat carrier to the geothermal heat reservoir.

9. The geothermal loop in-ground heat exchanger as claimed in claim 8 wherein the elongate conduit extends laterally away from the heat exchanger and is shaped to reinject the spent or depleted heat carrier into a portion of the geothermal heat reservoir.

10. The geothermal loop in-ground heat exchanger as claimed in claim 9 provided with more than one reinjection portion and elongate conduit in order to allow an operator to shift a reinjection location and/or depth in order to maintain a useable heat gradient in the geothermal heat reservoir.

11. The geothermal loop in-ground heat exchanger as claimed in claim 1 further including an expanded lower heat shell portion in addition to the counter current heat shell, the expanded lower heat shell portion extending generally downwardly from the counter current heat shell at the bottom of the heat exchanger.

12. The geothermal loop in-ground heat exchanger as claimed in claim 11 wherein the expanded lower heat shell portion is a closed shell in communication with the counter current heat shell and having entry openings spaced over the length of the expanded lower heat shell portion allowing the heat carrier to enter the lower heat shell portion.

13. A method of energy extraction from a geothermal heat reservoir including the steps of:
providing a geothermal loop in-ground heat exchanger having an outer tubular casing bounded by a horizontal lower wall and an tubular portion spaced from the outer tubular casing to define an injection space;
providing a counter current heat shell external to the outer tubular casing to enhance heat transfer to a working fluid;
wherein: the counter current heat shell is an annular shell closed at an upper end by a transverse upper wall and having a lower end, and bounded laterally by a vertical side wall,
a reinjection port located on the vertical side wall below the transverse upper wall of the counter current heat shell allowing a heat carrier to exit the counter current heat shell, and
entry openings are spaced evenly along the counter current heat shell between the reinjection port and the lower end of the countercurrent heat shell, the entry openings allowing the heat carrier to enter the counter current heat shell;
locating at least a portion of the heat exchanger in a geothermal heat reservoir;
injecting a working fluid at a first temperature, $T_1$, into the injection space; and
drawing off the working fluid from the inner tubular portion at a second temperature, $T_2$, greater than $T_1$.

14. The method of energy extraction from a geothermal heat reservoir as claimed in claim 13 including the additional steps of: utilizing the heat of the working fluid at the second temperature, $T_2$, in an appropriate thermodynamic recovery cycle in order to capture energy from the working fluid; and returning the working fluid to the heat exchanger at a temperature lower than the second temperature, $T_2$.

15. The method of energy extraction from a geothermal heat reservoir as claimed in claim 13 wherein if a naturally occurring geothermal heat reservoir does not containing at least 10 percent fluid by volume, the method further includes the step of injecting a fluid into the reservoir to provide at least 10 percent water by volume to maintain adequate heat transfer from the reservoir to the outer tubular casing.

16. The method of energy extraction from a geothermal heat reservoir as claimed in claim 13 further including the step of stimulating the geothermal heat reservoir in order to encourage heat flow about the heat exchanger.

17. The method of energy extraction from a geothermal heat reservoir as claimed in claim 16 wherein sequenced stimulation of particular heat zones in multiple steps is used in order to provide a systematic and more sustainable heat gradient.

* * * * *

UNITED STATES PATENT AND TRADEMARK OFFICE
CERTIFICATE OF CORRECTION

PATENT NO. : 9,541,309 B2
APPLICATION NO. : 14/535203
DATED : January 10, 2017
INVENTOR(S) : Rodney Grahame Colwell It is certified that error appears in the above-identified patent and that said Letters Patent is hereby corrected as shown below:

In the Specification

Column 1, Line 35:
"which is the remotely located" should read -- which is remotely located --

Column 2, Lines 46-47:
"through a well bore" should read -- through a wellbore --

Column 3, Line 10:
"the bore hole" should read -- the borehole --

Column 4, Line 50:
"support legs are spaced about" should read -- support legs spaced about --

Column 5, Line 1:
"expansion may take place" should read -- expansion that may take place --

Column 6, Line 3:
"in-round heat exchanger" should read -- in-ground heat exchanger --

Column 6, Line 6:
"an in ground heat exchanger" should read -- an in-ground heat exchanger --

Column 6, Lines 9-10:
"the in ground heat exchanger" should read -- the in-ground heat exchanger --

Column 7, Line 50:
"the in ground heat exchanger" should read -- the in-ground heat exchanger --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

Column 7, Line 64:
"promote or and hence" should read -- promote or enhance --

Column 8, Lines 33-34:
"some of the issue that" should read -- some of the issues that --

Column 9, Line 15:
"simulated tempter" should read -- simulated temperature --

Column 9, Lines 21-22:
"simulated temper to" should read -- simulated temperature --

Column 9, Lines 27-28:
"simulated temper to" should read -- simulated temperature --

Column 9, Lines 30-31:
"simulated temper to" should read -- simulated temperature --

Column 9, Line 34:
"in ground heat exchanger" should read -- in-ground heat exchanger --

Column 10, Lines 8-9:
"in ground heat exchanger" should read -- in-ground heat exchanger --

Column 10, Lines 63-64:
"prevent heat loses." should read -- prevent heat losses. --

Column 11, Line 9:
"the balancing tank" should read -- the balancing tank. --

Column 12, Lines 19-20:
"in ground heat exchanger" should read -- in-ground heat exchanger --

Column 12, Line 33:
"promote or and hence" should read -- promote or enhance --

Column 13, Line 25:
"the Geothermal loop" should read -- the geothermal loop --

Column 14, Line 10:
"previously drilled The resource" should read -- previously drilled. The resource --

Column 15, Lines 19-20:

CERTIFICATE OF CORRECTION (continued)
U.S. Pat. No. 9,541,309 B2

"the Geothermal loop" should read -- the geothermal loop --

Column 15, Line 56:
"pSig separator pressure" should read -- psi-g separator pressure --

Column 17, Line 57:
"reservoir fluid flow" should read -- reservoir fluid flow. --

Column 18, Line 18:
"heat exchanger" should read -- heat exchanger. --

Column 21, Line 17:
"(12,000/210,782)" should read -- (21,000/210,782) --

Column 21, Line 17:
"5 psig" should read -- 5 psi-g --

Column 21, Line 60:
"pressure of 5 bara" should read -- pressure of 5 bars --

Column 22, Line 31:
"bara (compared to 120 bara" should read -- bars (compared to 120 bars --

Column 22, Line 54:
"fluid exit" should read -- fluid exits --

In the Claims

Column 26, Line 5 Claim 13:
"and an tubular portion" should read -- and a tubular portion --

Column 26, Line 38 Claim 15:
"does not containing at least" should read -- does not contain at least --